(12) United States Patent
Edwards et al.

(10) Patent No.: US 11,681,409 B2
(45) Date of Patent: *Jun. 20, 2023

(54) SYSTEMS AND METHODS FOR AUGMENTED OR MIXED REALITY WRITING

(71) Applicant: Capital One Services, LLC, McLean, VA (US)

(72) Inventors: Joshua Edwards, Philadelphia, PA (US); Jacob Learned, Shawnee, KS (US); Eric Loucks, McLean, VA (US)

(73) Assignee: Capital One Servies, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,791

(22) Filed: Jun. 2, 2022

(65) Prior Publication Data

US 2022/0291809 A1 Sep. 15, 2022

Related U.S. Application Data

(63) Continuation of application No. 16/891,325, filed on Jun. 3, 2020, now Pat. No. 11,372,518.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/167* (2013.01); *G06N 3/08* (2013.01); *G06V 20/20* (2022.01)

(58) Field of Classification Search
CPC ...... G06F 3/04815; G06F 3/011; G06F 3/167; G06F 3/017; G06N 3/08; G06V 20/20; G06V 30/32

See application file for complete search history.

(56) References Cited

U.S. PATENT DOCUMENTS 8,854,433 B1   10/2014   Rafil
8,947,455 B2   2/2015    Friesen
(Continued)

OTHER PUBLICATIONS

Vikram et al. "Handwriting and Gestures in the Air, Recognizing on the Fly" (Apr. 27, 2013),. In CHI 2013, Paris, France, Accessed Jan. 13, 2021, http://people.eecs.berkeley.edu/-russell/papers/chi 13-3Dhandwriting.pdf (Year: 2013).

(Continued)

*Primary Examiner* — Kieu D Vu
*Assistant Examiner* — Rami R Okasha
(74) *Attorney, Agent, or Firm* — Perkins Coie LLP

(57) ABSTRACT

An augmented reality system that includes processors and storage devices storing instructions. The instructions configure the processors to perform operations. The operations include identifying a writing object in a video feed being displayed in an augmented reality viewer, identify a tip of the writing object based on a contour of the writing object, and tracking movements of the tip in the augmented reality viewer. The operations may also include generating a virtual file, the virtual file storing the tracked movements and generating a text file by performing an image recognition operation associating the tracked movements stored in the virtual file with one or more characters.

20 Claims, 23 Drawing Sheets

(51) Int. Cl.
  *G06F 3/16*   (2006.01)
  *G06N 3/08*   (2023.01)
  *G06V 20/20*  (2022.01)

(56) References Cited

U.S. PATENT DOCUMENTS

| | | |
|---|---|---|
| 9,111,326 B1 | 8/2015 | Worley, III et al. |
| 10,067,568 B2 | 9/2018 | Di Censo et al. |
| 10,126,820 B1 | 11/2018 | Chang et al. |
| 10,203,781 B2 | 2/2019 | Gavriliuc et al. |
| 10,262,290 B1 | 4/2019 | Mossoba et al. |
| 10,331,874 B1 | 6/2019 | Benkreira et al. |
| 10,540,819 B2 | 1/2020 | Aurongzeb et al. |
| 10,877,568 B2 | 12/2020 | Huang et al. |
| 2003/0071754 A1 | 4/2003 | McEwan |
| 2006/0257025 A1 | 11/2006 | Simmons et al. |
| 2007/0112841 A1 | 5/2007 | Iwayama et al. |
| 2009/0070060 A1 | 3/2009 | Bang et al. |
| 2009/0136136 A1 | 5/2009 | Mori et al. |
| 2010/0306649 A1 | 12/2010 | Russ et al. |
| 2013/0050069 A1* | 2/2013 | Ota .............. G06F 3/0304 345/156 |
| 2013/0106748 A1 | 5/2013 | Hosaka et al. |
| 2013/0222381 A1 | 8/2013 | Di Censo et al. |
| 2015/0116282 A1 | 4/2015 | Black et al. |
| 2015/0317837 A1 | 11/2015 | Sholudko et al. |
| 2015/0338940 A1 | 11/2015 | Vong |
| 2016/0005205 A1 | 1/2016 | Liang et al. |
| 2016/0139691 A1 | 5/2016 | Li et al. |
| 2016/0260255 A1 | 9/2016 | Bean et al. |
| 2016/0334941 A1 | 11/2016 | Nader et al. |
| 2016/0364010 A1 | 12/2016 | Amma et al. |
| 2017/0024035 A1 | 1/2017 | Pelis et al. |
| 2017/0177151 A1 | 6/2017 | Yoshimura et al. |
| 2017/0192493 A1 | 7/2017 | Ofek et al. |
| 2017/0214862 A1 | 7/2017 | Matsubara et al. |
| 2017/0329768 A1 | 11/2017 | Plowman et al. |
| 2018/0018057 A1 | 1/2018 | Bushnell et al. |
| 2018/0075658 A1 | 3/2018 | Lanier et al. |
| 2018/0157904 A1* | 6/2018 | Girish .............. G06V 10/44 |
| 2019/0019022 A1 | 1/2019 | Marda et al. |
| 2019/0096129 A1 | 3/2019 | Rhodes et al. |
| 2019/0155394 A1 | 5/2019 | Bedikian et al. |
| 2019/0236845 A1 | 8/2019 | Rhodes et al. |
| 2020/0042111 A1 | 2/2020 | Connellan et al. |
| 2020/0043354 A1* | 2/2020 | Ha .............. G06V 20/20 |
| 2020/0097724 A1 | 3/2020 | Chakravarty et al. |
| 2020/0356251 A1 | 11/2020 | Gobera Rubalcava et al. |
| 2020/0387287 A1 | 12/2020 | Ravasz et al. |
| 2020/0410222 A1 | 12/2020 | Chang et al. |
| 2021/0110700 A1* | 4/2021 | Harman .............. G06V 20/46 |

OTHER PUBLICATIONS

Murata et. al., "Hand Gesture and Character Recognition Based on Kinect Sensor" (Jul. 6, 2014), International Journal of Distributed Sensor Networks, Accessed Jan. 13, 2021, https://doi.org/10.1155/2014/278460 (Year: 2014).

Wacker et. al. "ARPen: Mid-Air Object Manipulation Techniques for a Bimanual AR System with Pen & Smartphone" (May 4-9, 2019). In Proceedings of CHI '19. Association for Computing Machinery, New York, NY, USA, Paper 619, 1-12. DOI:https://doi.org/10.1145/3290605.3300849 (Year: 2019).

* cited by examiner

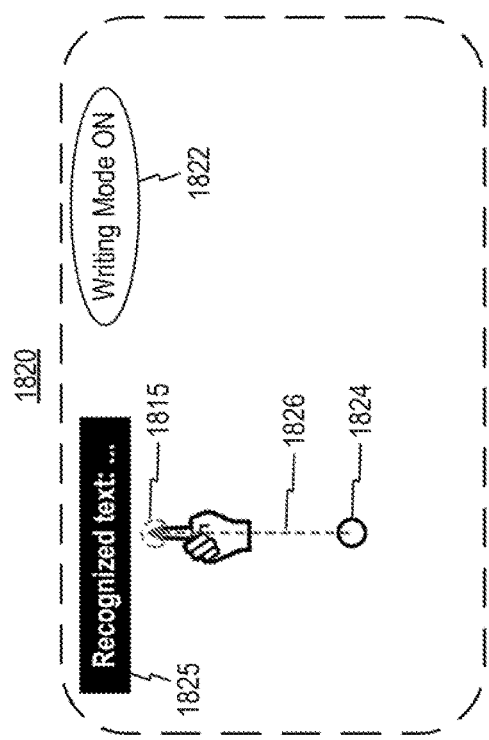
FIG. 18A
FIG. 18B
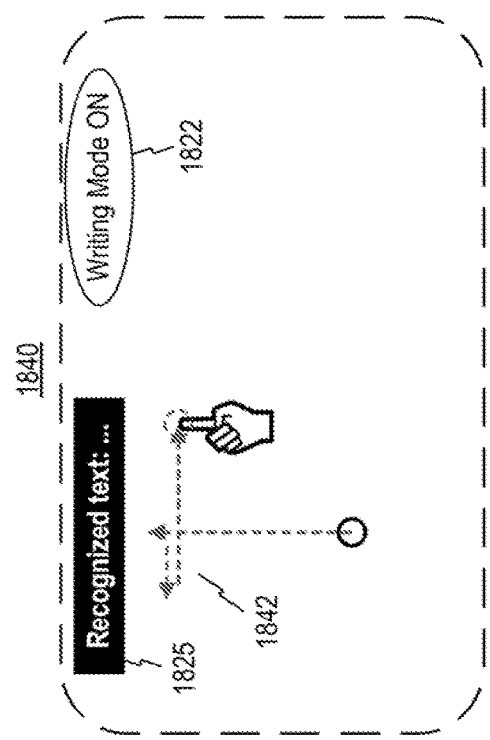
FIG. 18C
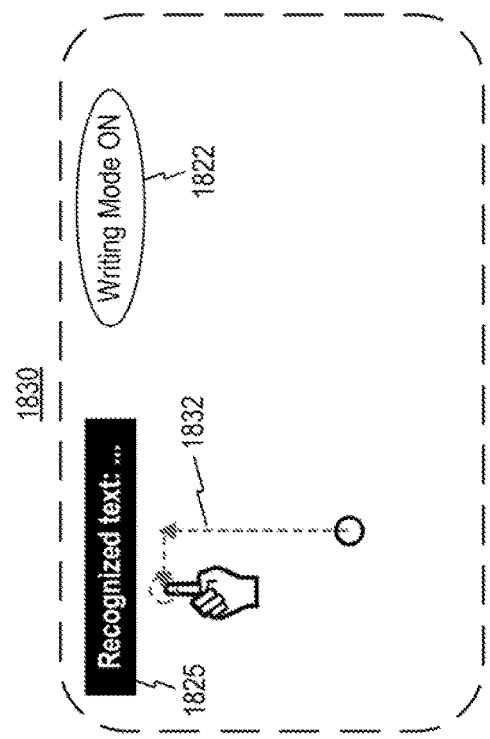
FIG. 18D

SYSTEMS AND METHODS FOR AUGMENTED OR MIXED REALITY WRITING

CROSS-REFERENCE TO RELATED APPLICATION

This application is a continuation of U.S. patent application Ser. No. 16/891,325, filed on Jun. 3, 2020. The disclosure of the above-referenced application is expressly incorporated herein by reference in its entirety.

TECHNICAL FIELD

The present disclosure relates generally to systems and methods for augmented or mixed reality writing applications and, more particularly, to systems and methods combining image recognition techniques with augmented reality tools to enable visualization, recording, and analysis of writing inputs.

BACKGROUND

Augmented reality tools create interactive experiences in which real-time images of objects are enhanced by computer-generated perceptual information. Augmented reality tools can manipulate images of real environments by adding information (overlaid on the natural environment), removing information (masking the natural environment), or modifying information (altering the natural environment). This manipulation of environments results in a seamless experience that merges physical elements with virtual, computer-generated features. Thus, augmented reality tools can alter a user's ongoing perception of a real-world environment.

The virtuality continuum also includes mixed reality tools, which may include a subset of augmented reality tools that blend the physical world with the digital world. Mixed reality tools create environments of interaction using computer vision, graphical processing power, display technology, and input systems. Mixed reality tools include environmental manipulation, spatial customization, and location-based virtual reality experiences.

Augmented and mixed reality has been explored for multiple applications in education, entertainment, healthcare, and marketing, among others. For example, augmented reality tools have been used to create new types of video games. Also, augmented reality has been used for in-store marketing, interactive textbooks, and medical training. However, one of the key outstanding challenges for augmented or mixed reality applications is determining an effective and simple method to capture information. Certain augmented reality applications use devices such as a mouse, a keyboard, or a touchscreen, to allow a user to interact with the application. Other applications employ more specialized devices, such as styluses or headsets, or combination of devices, such as styluses with specially configured pads or screens. But such type of input methods are often impractical for certain applications. For instance, using a stylus is impractical for ad hoc uses, increases costs, and may deter new users. Further, augmented or mixed reality applications based on specially configured headsets may have limited applicability and prohibitive cost.

The disclosed systems and methods for augmented reality writing address one or more of the problems set forth above and/or other problems in the prior art.

SUMMARY

One aspect of the present disclosure is directed to an augmented reality system that includes one or more processors and one or more storage devices storing instructions. The instructions configure the one or more processors to perform operations. The operations include identifying a writing object in a video feed being displayed in an augmented reality viewer, identify a tip of the writing object based on a contour of the writing object, and tracking movements of the tip in the augmented reality viewer. The operations may also include generating a virtual file, the virtual file storing the tracked movements and generating a text file by performing an image recognition operation associating the tracked movements stored in the virtual file with one or more characters.

Another aspect of the present disclosure is directed to a non-transitory computer-readable medium storing instructions that, when executed by a processor, cause the processor to operate an augmented reality system. The operations include identifying a writing object in a video feed being displayed in an augmented reality viewer, identify a tip of the writing object based on a contour of the writing object, and tracking movements of the tip in the augmented reality viewer. The operations may also include generating a virtual file (the virtual file storing the tracked movements) and generating a text file by performing an image recognition operation associating the tracked movements stored in the virtual file with one or more characters.

Yet another aspect of the present disclosure is directed to a computer-implemented method for generating augmented reality images. The method may include identifying a writing object in a video feed being displayed in an augmented reality viewer, identify a tip of the writing object based on a contour of the writing object, and tracking movements of the tip in the augmented reality viewer. The operations may also include generating a virtual file (the virtual file storing the tracked movements) and generating a text file by performing an image recognition operation associating the tracked movements stored in the virtual file with one or more characters.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 18A-18J illustrate a sequence of exemplary augmented reality graphical user interfaces describing multiple stages of a text recognition operation, consistent with disclosed embodiments.

DETAILED DESCRIPTION

Figure 1:
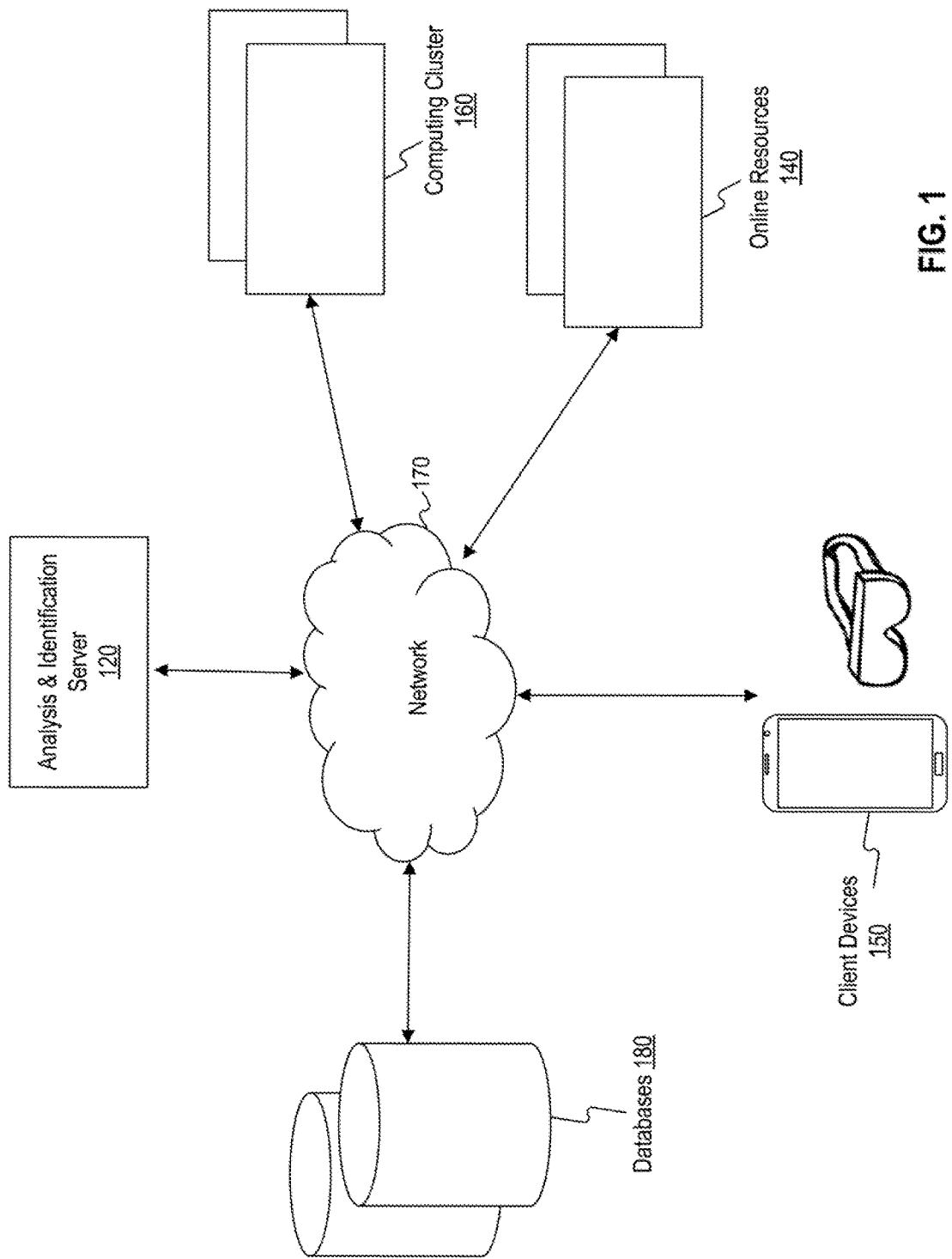
FIG. 1 is a block diagram of an exemplary system, consistent with disclosed embodiments.

The disclosure is generally directed to systems and methods for augmented or mixed reality writing. The disclosed systems and methods may improve augmented reality (AR) or mixed reality (MR) tools by providing simple, flexible, and easy to use input methods. The disclosed systems and methods may also enable writing applications that allow users to take notes with no paper trail and retain backups of searchable files. Moreover, embodiments of the disclosed systems may allow integration of AR and MR tools to mobile and wearable devices with a seamless user experience (UX). For example, disclosed systems and methods may integrate with wearable devices by passively scanning video and performing background image recognition.

The disclosed systems and methods may also improve the technical field of AR visualization by providing tools for concurrent capture and image analysis of video streams. By combining image recognition with machine learning methods, the disclosed systems and methods may facilitate user interaction and capturing user input. For example, in some embodiments, the disclosed systems and methods may combine object detection with convolutional neural networks (CNNs) and deep-learning object tracking to identify and track an input. Some embodiments of the disclosed systems and methods may allow an AR or MR application to identify a generic object (such as a finger, pencil, or stick) as a writing input and track it to identify user input. Such embodiments may avoid use of specialized input devices and, therefore, reduce costs and improve UX.

Moreover, embodiments of the disclosed systems and methods may improve AR applications by combining multiple sources of user input. For example, embodiments of the disclosed systems and methods may combine voice, video, location, and accelerometer inputs to more precisely identify user inputs when running an AR application. For example, disclosed systems and methods may employ techniques of data monitoring that combine multiple inputs to improve accuracy of the user input.

Further, the disclosed systems and methods may improve the field of AR applications by using machine-learning techniques to accurately identify user inputs and generate metadata and/or searchable files that organize user information. For example, disclosed systems and methods may improve the technical field of image recognition by customizing optical character recognition (OCR) and intelligent word recognition (IWR) libraries for a specific user. In some embodiments, disclosed systems and methods may leverage deep learning to make predictions about particular correlations between characters and patterns or traces. The disclosed systems and methods may use such customized libraries to transform unsearchable images to searchable files. Accordingly, embodiments of the disclosed systems and methods may facilitate generating uniform formats to create data repositories with files that can be aggregated and analyzed.

In addition, embodiments of the disclosed systems and methods may improve use of mobile devices for AR applications by communicating information using files of low size. Some of the disclosed systems and methods may reduce network congestion by performing analysis locally, generating files of low size, and transmitting the low size files through the network. For instance, in some embodiments the disclosed systems may perform image recognition locally and generate a file of small size (such as a simple text file) that is transmitted to other devices. In certain embodiments, transmitting text files instead of images may reduce network congestion by orders of magnitude.

Moreover, the disclosed systems and methods may improve the technical field of AR processing by facilitating interconnectivity between multiple devices. Some embodiments of the disclosed systems and methods may enable seamless exchange of information between mobile devices by creating standardized formats of data inputted into the AR application. Instead of requiring specific devices to transform data into a format that can be displayed on particular devices, disclosed systems and methods may improve the technical field of multi-casting device communication by synchronizing devices with standard formats.

Furthermore, disclosed systems and methods may improve AR graphical user interfaces (GUIs) by providing interactive icons that are modified and/or displayed based on the context of the user. For example, disclosed systems and methods may provide GUIs that improve the accuracy of user interactions by displaying pre-selected actions, to prevent unwanted or accidental selections. Alternatively, or additionally, the disclosed systems and methods may generate GUIs that provide real-time feedback and improve image recognition ability. For example, certain embodiments of the disclosed systems and methods may modify the background video or image to show tracked objects while concurrently showing the results of image analysis. Such features may improve UX.

Further, the disclosed systems and methods may generate GUIs that more effectively manage screen space during AR applications, improving AR visualization. For example, disclosed systems and methods may generate GUIs for electronic devices with small screens. Such GUIs may be generated to allow users to quickly access certain data or functions. In these embodiments, icons may appear or disappear based on user actions or commands to more effectively allow users to operate an AR application. Particularly for portable devices, in which the screen space is limited, the disclosed systems and methods may generate dynamic GUIs that specifically display elements that are relevant for a user search while removing irrelevant elements. For example, the disclosed methods generate AR GUIs that, based on user selections, maximize screen space by eliminating, minimizing, enlarging, hiding, and/or re-shaping items in a field of view. These GUI configurations may facilitate performing searching or browsing tasks.

Reference will now be made in detail to the disclosed embodiments, examples of which are illustrated in the accompanying drawings.

FIG. 1 is a block diagram of an exemplary system 100, consistent with disclosed embodiments. System 100 may be used to generate AR or MR GUIs that capture writing inputs consistent with disclosed embodiments. System 100 may include an analysis and Identification (A&I) server 120, online resources 140, mobile devices 150, computing clusters 160, and databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with a cloud computing service. In other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of alerts, and/or completion messages and notifications.

Databases 180 may include one or more computing devices and storage devices configured with appropriate software to perform operations consistent with providing A&I server 120 and mobile devices 150 with data associated with OCR, identification of writing objects, or tracking of movement. Databases 180 may include, for example, Oracle™ databases, Sybase™ databases, or other relational databases or non-relational databases. While databases 180 are shown separately, in some embodiments databases 180 may be included in or otherwise related to one or more of A&I server 120 and online resources 140.

Databases 180 may be configured to collect and/or maintain the data associated with OCR tables and provide it to A&I server 120 and/or mobile devices 150. Databases 180 may collect the data from a variety of sources, including, for instance, online resources 140. Databases 180 are further described below in connection with FIG. 2.

Mobile devices 150 may include one or more computing devices configured to perform operations consistent with disclosed embodiments. For example, mobile devices 150 may include a desktop computer, a laptop, a server, a mobile device (e.g., tablet, smart phone, etc.), a gaming device, a wearable computing device, or other type of computing device. Mobile devices 150 may include one or more processors configured to execute software instructions stored in memory, such as memory included in mobile devices 150, to perform operations to implement the functions described below. Mobile devices 150 may include software that, when executed by a processor, execute AR or MR applications and perform operations of image recognition, object tracking, and generating modified video feeds and/or GUIs. Further, mobile devices 150 may include software to provide internet-related communication and content display processes. For instance, mobile devices 150 may execute browser software that generates and displays interfaces including content on a display device included in, or connected to, mobile devices 150. Mobile devices 150 may execute applications that allows mobile devices 150 to communicate with components over network 170 and generate and display content in interfaces via display devices included in mobile devices 150. The display devices may be configured to display GUIs described in FIGS. 16-20. The disclosed embodiments are not limited to any particular configuration of mobile devices 150. For instance, a mobile device 150 may be a mobile device that stores and executes mobile applications to perform operations that provide functions offered by A&I server 120 and/or online resources 140, such as providing executing instructions to implement an AR application.

In some embodiments, mobile devices 150 may include a plurality of isolated devices working self-sufficiently. For example, mobile devices 150 may include a plurality of smartphones and/or a plurality of smart glasses capable of both capturing images or data and performing disclosed movement tracking and AR operations. In other embodiments, however, mobile devices 150 may include a plurality of coordinated devices comprising a processing (or core) device coupled to peripheral devices. For example, mobile devices 150 may include a smartphone or a tablet coupled to peripheral devices, such as glasses with mounted cameras and/or head-up displays (HUDs).

In such embodiments, the peripherals may capture images and transmit data to the nearby smartphone, which processes the data to perform the AR operations. Further, in such embodiments the smartphone may transmit data back to the peripherals for generating user interfaces via the peripheral devices. Additionally, or alternatively, in such embodiments both the processing device and the peripherals of mobile devices 150 may be configured to capture images. For example, both a smartphone and peripheral HUDs may capture images allowing mobile devices 150 to capture images from multiple angles and viewpoints to enable triangulations and determining depths. Moreover, in certain embodiments mobile devices 150 may include three or more out-of-axis cameras for triangulation. Such arrangement may allow mobile devices 150 to improve depth perception accuracy by concurrently using cameras in several of the coordinated devices. For instance, each of mobile devices 150 may include a smartphone (as processing device), smart glasses, digital cameras, and/or jacket wearable cameras (as peripheral devices). In such embodiments, mobile devices 150 may capture images from multiple view points by simultaneously capturing images from the camera in the smartphone, the camera in the smart glasses, and the jacket wearable camera. Further, in some embodiments mobile devices 150 may split image collection and processing between different devices. For example, in certain embodiments peripherals of mobile devices 150 may perform certain filtering or compression operations while the processing device is dedicated to performing AR operations.

In certain embodiments, mobile devices 150 may be configured to execute software instructions relating to location services, such as GPS systems. For example, mobile devices 150 may be configured to determine a geographic location and provide location data and time-stamp data corresponding to the location data. In yet other embodiments, mobile devices 150 may have cameras to capture video. Mobile devices 150 are further described below in connection with FIG. 3.

Computing clusters 160 may include a plurality of computing devices in communication. For example, in some embodiments, computing clusters 160 may be a group of processors in communication through fast local area networks. In other embodiments computing clusters 160 may be an array of graphical processing units configured to work in parallel as a GPU cluster. In some embodiments, computing clusters 160 may include a GPU driver for each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster.

A&I server 120 may take the form of a server, a general purpose computer, a mainframe computer, or any combination of these components. In other embodiments, A&I server 120 may be a virtual machine. A&I server 120 may include one or more computing systems that collect images and process them to create training data sets that can be used to develop image identification models. For example, A&I server 120 may include an image collector that collects images that are then used for training a linear regression classifier or a CNN.

Further, A&I server 120 may be configured to generate augmented reality GUIs. A&I server 120 may receive or obtain information from databases 180, computing clusters 160, and online resources 140. For example, A&I server 120 may receive a plurality of AR models from databases 180 and/or online resources 140. In some embodiments, A&I server 120 may receive and satisfy requests from mobile devices 150 to generate AR GUIs.

A&I server 120 may also be configured to perform operations consistent with identifying characters in an image and/or identifying writing objects, such as elongated objects or fingers, in a video feed or image. For instance, in some embodiments A&I server 120 may receive a request to identify characters in an image. A&I server 120 may receive the request directly from mobile devices 150. For such tasks, A&I server 120 may configured to use CNNs for attribute identification. Identification models of A&I server 120 may also include Random Forests, composed of a combination of decision tree predictors. Moreover, A&I server 120 may generate an identification result based on the information received from mobile devices 150 requests and transmit the information to other elements of system 100. In some embodiments, A&I server 120 may also perform machine-learning training operations to improve accuracy of image recognition processes. For example, A&I server 120 may include an image collector, an image normalizer module, and a feature extraction module that in conjunction may create a machine-learning model to identify characters in an image and/or track movement from a writing input. A&I server 120 is further described in connection with FIG. 4.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
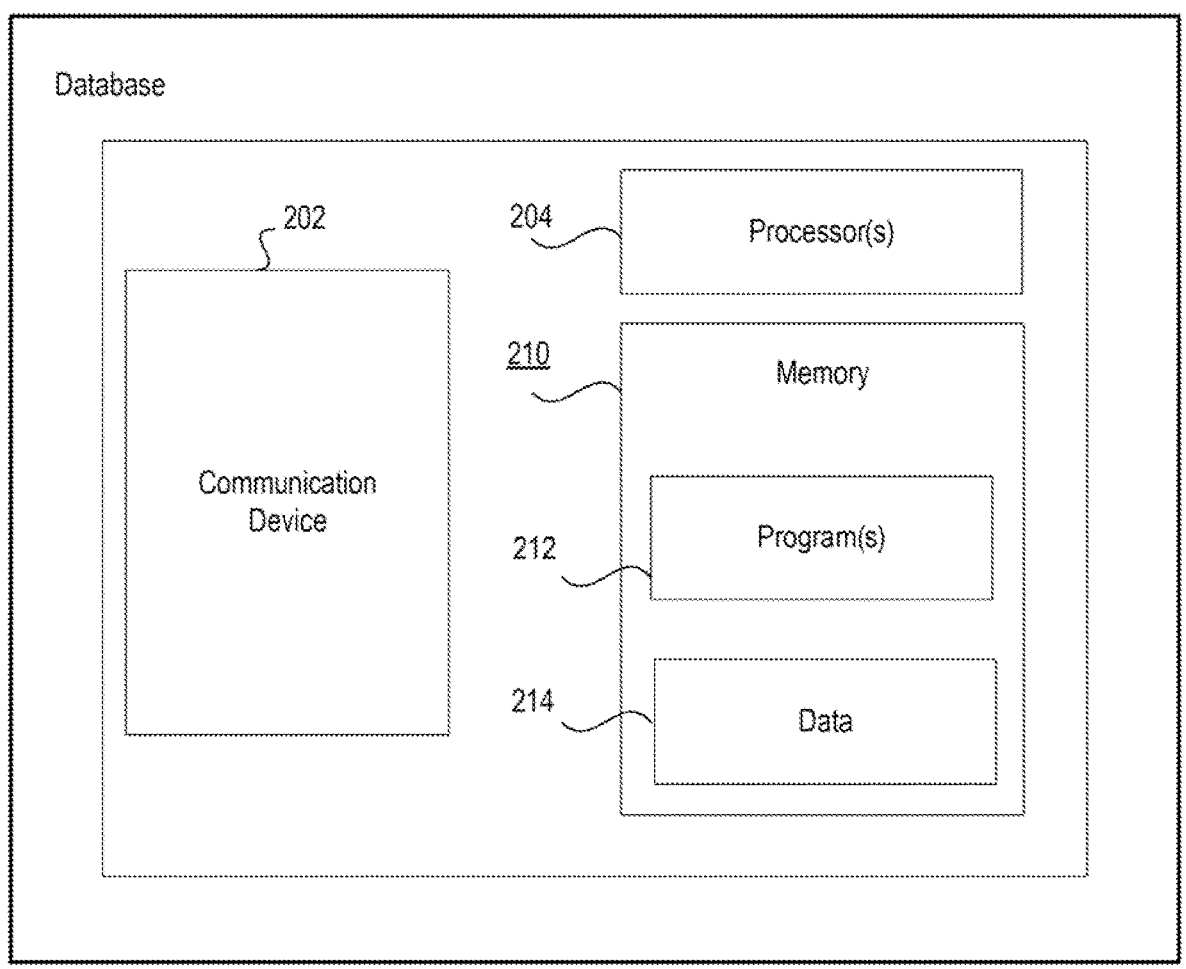
FIG. 2 is a block diagram of an exemplary database, consistent with disclosed embodiments.

FIG. 2 is a block diagram of an exemplary database 180 (FIG. 1), consistent with disclosed embodiments. Database 180 may include a communication device 202, one or more data, one or more database processors 204, and a database memory 210 including one or more database programs 212 and data 214.

In some embodiments, databases 180 may take the form of servers, general-purpose computers, mainframe computers, or any combination of these components. Other implementations consistent with disclosed embodiments are possible.

Communication device 202 may be configured to communicate with one or more elements of system 100, such as A&I server 120 (FIG. 1) or mobile devices 150, either directly or via network 170. Communication device 202 may include, for example, one or more digital and/or analog devices that allow communication device 202 to communicate with and/or detect other components, such as a network controller and/or wireless adaptor for communicating over the Internet. Other implementations consistent with disclosed embodiments are possible. Further, communication device 202 may be configured to communicate with one or more components of system 100, such as online resource 140. In particular, communication device 202 may be configured to provide to A&I server 120 and mobile device 150 OCR tables or image recognition models that may be used to generate AR or MR GUIs.

Database processors 204 may include one or more known processing devices, such as, but not limited to, microprocessors from the Pentium™ or Xeon™ family manufactured by Intel™, the Turion™ family manufactured by AMD™ or any of various processors from other manufacturers. However, in other embodiments, database processors 204 may be a plurality of devices coupled and configured to perform functions consistent with the disclosure.

Data 214 may be data associated with customized OCR tables and/or image recognition data. For example, data 214 may include training data that uses user feedback and training images to generate customized OCR tables. Additionally, data 214 may include historic AR or MR images and previous interactions between a user and an AR application. For example, data 214 may include text files of storing the results of previous OCR operations. Data 514 may include AR models for different writing inputs (e.g., AR models for pencils, fingers, or hands), exceptions to image recognition (e.g., default options for certain symbols), and image recognition models (e.g., the convolutional neural network for image recognition).

Figure 3A:
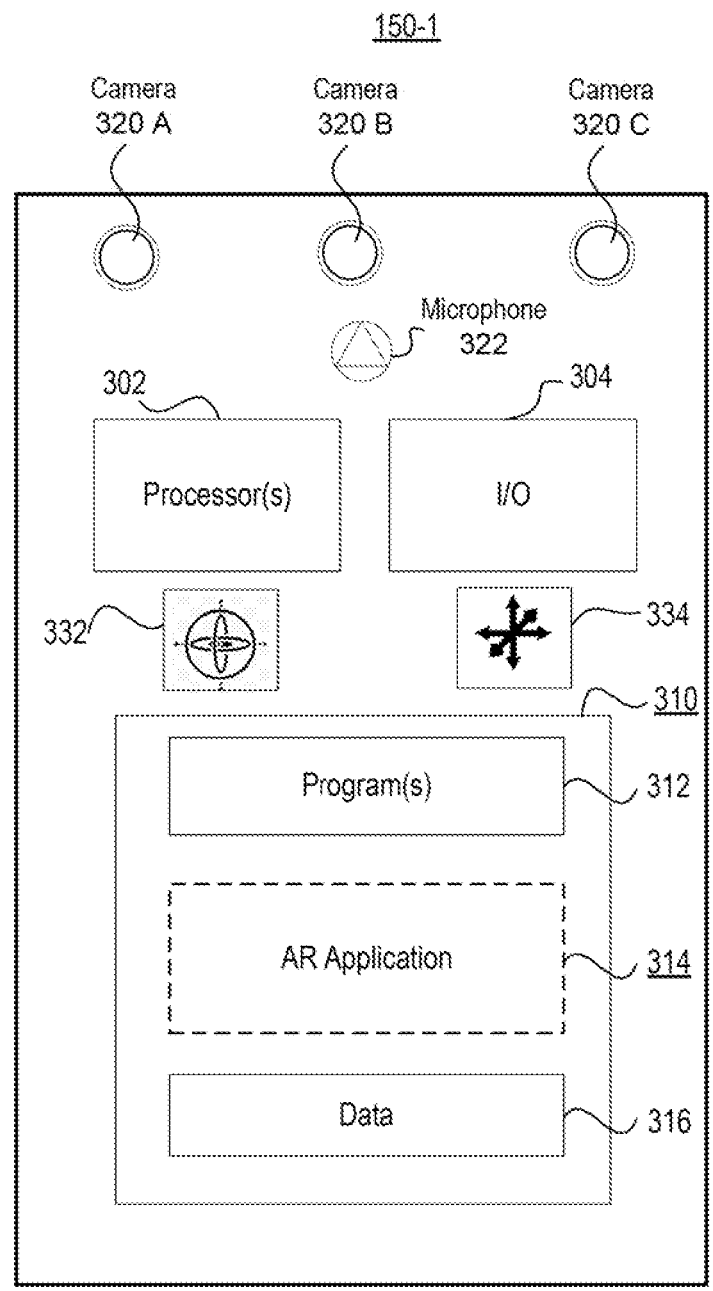
FIG. 3A is a block diagram of a first example of a mobile device, consistent with disclosed embodiments.

FIG. 3A is a block diagram of a first example of one of mobile devices 150 (FIG. 1) labeled exemplary mobile device 150-1, consistent with disclosed embodiments. In some embodiments, mobile devices 150 may include one or more of exemplary mobile device 150-1.

In some embodiments, exemplary mobile device 150-1 may include one or more processors 302, one or more input/output (I/O) devices 304, and one or more memory units 310. Further, exemplary mobile device 150-1 may take the form of mobile computing devices such as smartphones or tablets, general-purpose computers, or any combination of these components. Further, exemplary mobile device 150-1 may take the form of wearable devices, such as smart glasses or smartwatches. Alternatively, exemplary mobile device 150-1 (or systems including mobile devices 150) may be configured as a particular apparatus, embedded systems, dedicated circuit, and the like based on the storage, execution, and/or implementation of the software instructions that perform one or more operations consistent with the disclosed embodiments. According to some embodiments, mobile devices 150 may include web browsers or similar computing devices that access web site consistent with disclosed embodiments.

Processor 302 may include one or more known processing devices, such as mobile device microprocessors manufactured by Intel™, NVIDIA™, or various processors from other manufacturers. The disclosed embodiments are not limited to any specific type of processor configured in mobile devices 150.

Memory units 310 may include one or more storage devices configured to store instructions used by processor 302 to perform functions related to disclosed embodiments. For example, memory units 310 may be configured with software instructions, such as programs 312, that may perform operations when executed by processor 302. The disclosed embodiments are not limited to separate programs or computers configured to perform dedicated tasks. For example, memory units 310 may include a single program 312 that performs the functions of the mobile devices 150, or program 312 may include multiple programs.

Memory units 310 may include instructions to perform image classification and/or generate GUIs. For example, memory units 310 may store instructions that configure processor 302 to perform image classification operations, such as extracting attributes from images, searching other images with similar attributes, and generating GUIs to display image classification results. Memory units 310 may also include instructions to generate dynamic GUIs after receiving user commands. For example, memory units 310 may include instructions to generate AR GUIs with interactive icons, further described in connection with FIGS. 18-20.

In certain embodiments, memory units 310 may store an AR application 314 that may be executed by processor 302 to perform image identification processes consistent with disclosed embodiments. In certain embodiments, AR application 314, or another software component, may be configured to generate modified video streams. For example, AR application 314 may configure an AR viewer, store image recognition operations, and handle look-up tables that correlate identified attributes with available characters or text. Moreover, AR application 314 may be modifiable or updatable with patches received from other elements of system 100. For example, if A&I server 120 issues a patch for a classification or identification model, AR application 314 may run the patch to update identification models or update mapping data. Moreover, AR application 314 may also include instructions to generate AR GUIs, as further described in connection to FIGS. 16-20.

AR application 314 may also configure processor 302 to communicate with A&I server 120. For instance, through AR application 314, mobile devices 150 may communicate with A&I server 120 to report a location and request AR models. For example, AR application 314 may generate HTTP requests or other TCP/IP packets directed to A&I server 120 with data for generating AR features.

In some embodiments, AR application 314 may perform image compression specifically for traces of a moving writing object. For example, in some embodiments instead of transmitting the full image through the network for OCR, AR application 314 may transmit or receive only key features of the image, such as movement traces or identified writing input.

In some embodiments, AR application 314 may employ a series of pre-programmed modules to manipulate or modify captured video feeds to show the path of movement of an object or identify a specific object in a video feed. For example, AR application 314 may configure processor 302 to create AR GUIs using WebXR™ APIs and standards for rendering 3D scenes. In such embodiments, processor 302 may perform WebXR functions for initiating a modified video session such as: enum XRSessionMode {"inline", "immersive-vr", "immersive-ar"}; navigator.xr.supportsSession('immersive-ar').then(( )=>{//'immersive-ar' sessions supported.}

Further, AR application 314 may configure processor 302 to perform functions to generate blended environments, which combine objects or images of the captured video feed with computer-generated features. For example, processor 302 may perform WebXR functions as: enum XREnvironmentBlendMode {"opaque", "alpha-blend", "additive"}; partial interface XRSession {//Attributes readonly attribute XREnvironmentBlendMode environmentBlendMode;}.

Additionally, or alternatively, AR application 314 may configure processor 302 to dictate behaviors of elements added, masked, or modified in the AR video feed. For example, processor 302 may present content applying a specific blending technique to combine virtual pixels with the real-world environment. The appropriate technique and behavior of the element may be determined based on the target device's display technology and the mode. In such embodiments, processor 302 may choose to perform opaque, alpha-blend, or additive environments. When performing opaque environment blending, processor 302 may render buffers obtained by a mobile device and source-over blending on top of buffers containing exclusively 100% opaque black pixels and applying opaque and pass-through displays when the mode is set to either "immersive-vr" or "inline."

Alternatively, or additionally, AR application 314 may configure processor 302 to perform alpha-blend environment blending, using source-over blending on top of buffers and manipulating pixel representations of the captured environment. In such embodiments, processor 302 may align pixel representations with XRFrames to transform each view. Furthermore, in some embodiments processor 302 may perform operations for additive environment blending, in which processor 302 may render buffers obtained in an augmented reality viewer and create a composite using lighter blending before being presented on a mobile device.

I/O devices 304 may include one or more devices configured to allow data to be received and/or transmitted by mobile devices 150 and to allow mobile devices 150 to communicate with other machines and devices, such as other components of system 100. For example, I/O devices 304 may include a screen for displaying optical payment methods such as Quick Response (QR) Codes or providing information to the user. I/O devices 304 may also include components for NFC communication. I/O devices 304 may also include one or more digital and/or analog devices that allow a user to interact with mobile devices 150 such as a touch-sensitive area, buttons, or microphones. I/O devices 304 may also include one or more accelerometers to detect the orientation and inertia of mobile devices 150.

In certain embodiments, exemplary mobile device 150-1 may be configurable to perform certain operations that are similar to operations described for A&I server 120 (FIG. 1). For example, exemplary mobile device 150-1 may perform image identification operations using convolutional neural networks as described in connection to A&I server 120. Like in A&I server 120, exemplary mobile device 150-1 may also employ identification methods that include Random Forests, composed of a combination of decision tree predictors, CNNs, or regressions. Moreover, similar to A&I server 120, exemplary mobile device 150-1 may perform image recognition and AR GUI operations.

In some embodiments, mobile devices 150 may include one or more cameras 320 that is configured to capture video from multiple angles and send it to other components of system 100 via, for example, network 170.

Further, in some embodiments, mobile devices 150 may include one or more microphones 322, one or more accelerometers 334, and one or more gyroscopes 332. As further described in connection with FIG. 6, in some embodiments mobile devices 150 may employ accelerometers 334 and gyroscopes 332 to synchronize cameras 320 and facilitate depth perception operations and tracking of a writing input.

The components of mobile devices 150 may be implemented in hardware, software, or a combination of both hardware and software.

Figure 3B:
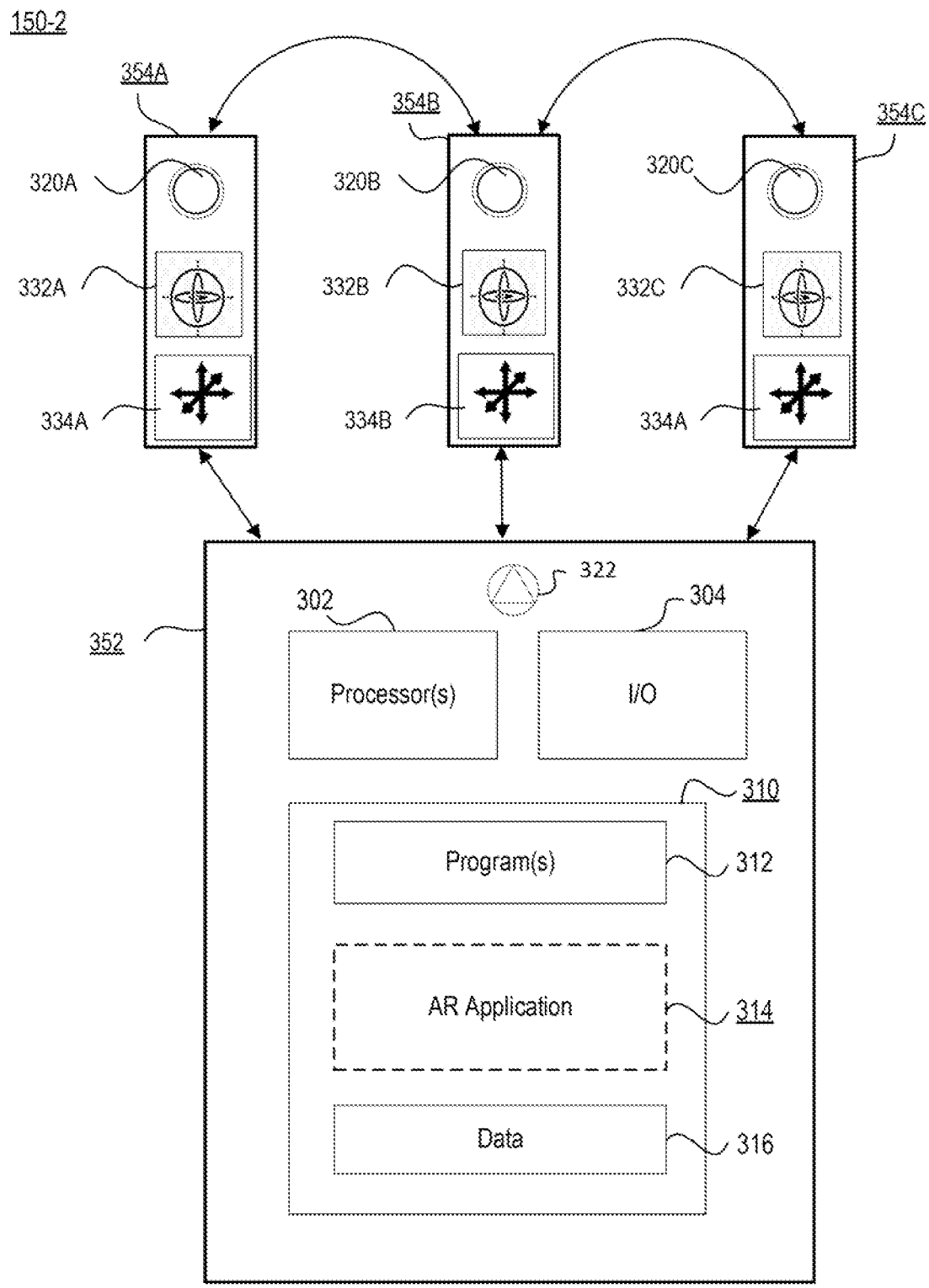
FIG. 3B is a block diagram of a second example of a mobile device, consistent with disclosed embodiments.

FIG. 3B is a block diagram of a second example of one of mobile devices 150 (FIG. 1) labeled exemplary mobile device 150-2, consistent with disclosed embodiments. In some embodiments, mobile devices 150 may include one or more of exemplary mobile device 150-2.

Mobile device 150-2 includes similar components as mobile device 150-1. However, instead of being in a single device, mobile device 150-2 may include multiple coordinated devices. For example, mobile device 150-2 may include a processing device 352 coupled to a plurality of peripheral devices 354, such as 354A, 354B, and 354C. Processing device 352 and peripheral devices 354 may coupled with wired or wireless methods.

Processing device 352 may be embodied with a computer, a smartphone, a tablet. a smartwatch or similar equipment. Further, as shown in FIG. 3B, processing device 352 may include processor 302, microphone 322, I/O devices 304, and memory units 310, which may include programs 312, AR application 314, and data 316. However, as shown in FIG. 3B, processing device 352 does not include cameras or other sensors. Instead, cameras 320, gyroscopes 332, and accelerometers 334 are in peripheral devices 354. Peripheral devices 354 may include HUDs, standalone cameras, glasses with mounted cameras, smart watches, or similar equipment.

In some embodiments, peripheral devices may include 3 or more out-of-axis cameras for triangulation and for depth estimation.

In some embodiments, mobile device 150-2 may be configured to segregate operations between processing and peripheral devices. In such embodiments, peripheral devices 354 may be configured to solely send and receive signals from a nearby processing device 352. For example, a smartphone, acting as processing device 352, may receive video data from peripheral devices 354 that include a digital camera, smart glasses, and a jacket wearable. Processing device 352 may process the video information to perform triangulations or depth calculations that, for example, track movements of a writing input.

Although FIG. 3B shows processing device 352 and peripheral devices 354 with distinct components, in some embodiments alternative configurations may be used for mobile devices 150. For example, processing device 352 may include cameras and peripheral devices 354 that perform some of the operations described below. Thus, the operations can be split any number of ways among a multitude of devices.

Figure 4:
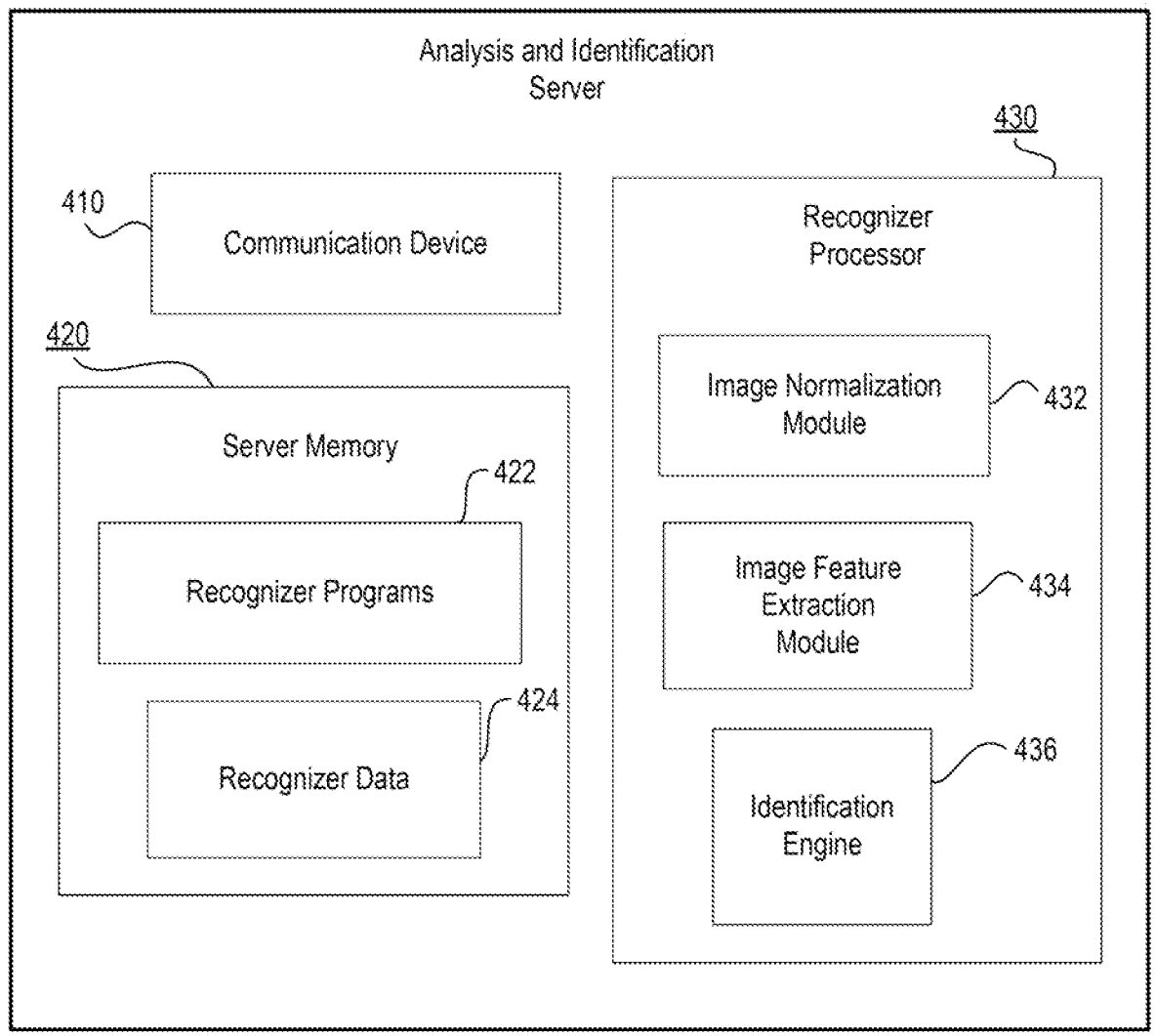
FIG. 4 is a block diagram of an exemplary analysis and identification server, consistent with disclosed embodiments.

FIG. 4 is a block diagram of an exemplary A&I server 120 (FIG. 1), consistent with disclosed embodiments. A&I server 120 may include a communication device 410, a server memory 420, and one or more server processors 430. Server memory 420 may include recognizer programs 422 and recognizer data 424. Server processor 430 may include an image normalization module 232, an image feature extraction module 234, and an identification engine 236.

Communication device 410 may be configured to communicate with one or more databases, such as databases 180 described above, either directly, or via network 170. Communication device 410 may include a network controller and/or wireless adaptor for communicating over the Internet.

Server memory 420 may include one or more storage devices configured to store instructions used by server processor 430 to perform functions related to disclosed embodiments. For example, server memory 420 may store software instructions, such as recognizer program 422, that may perform operations when executed by server processor 430. The disclosed embodiments are not limited to separate programs or computers configured to perform dedicated tasks.

In certain embodiments, server memory 420 may store instructions for carrying out processes to identify characters in an image, generate a list of identified attributes, and/or generate instructions to display a modified graphical user interface, described below in connection with FIGS. 16-20. In certain embodiments, server memory 420 may store instructions for identifying whether an image is acceptable for processing and generate instructions to guide the user in capturing an acceptable image. Other instructions are possible as well. In general, instructions may be executed by server processor 430 to perform processes consistent with disclosed embodiments.

In some embodiments, server processor 430 may include one or more known processing devices, such as, but not limited to, microprocessors. In other embodiments, server processor 430 may be a plurality of devices coupled and configured to perform functions consistent with the disclosure. In some embodiments, server processor 430 may execute software to perform functions associated with each component of server processor 430. In other embodiments, each component of server processor 430 may be an independent device.

Image normalization module 432 may normalize a received image so that writing inputs and/or characters can be identified. For example, communication device 410 may receive an image or video feed from mobile devices 150 to identify writing objects. The image may be in a format that cannot be processed by A&I server 120 because it is in an incompatible format or may have parameters that cannot be processed. For example, an image may be received in a specific format such as High Efficiency Image File Format (HEIC) or in a vector image format such as Computer Graphic Metafile (CGM). Then, image normalization module 432 may convert the received image to a standard format such as JPEG or TIFF. Alternatively, or additionally, the received image may have an aspect ratio that is incompatible with an identification model. For example, the image may have a 2.39:1 ratio, that may be incompatible with the identification model. Then, image normalization module 432 may convert the received image to a standard aspect ratio such as 4:3. In some embodiments, the normalization may be guided by a model image. For example, a model image stored in recognizer data 424 may be used to guide the transformations of the received image.

In some embodiments, server processor 430 may implement image normalization module 432 by executing instructions to transform received images. In other embodiments, however, image normalization module 432 may be a separate hardware device or group of devices configured to carry out image operations.

Image feature extraction module 434 may extract features from a received image, a video feed, or a normalized image. In some embodiments, features may be extracted from an image by applying a pre-trained convolutional neural network. For example, in some embodiments pre-trained networks such as Inception-v3, AlexNet, or TensorFlow may automatically extract features from a target image. In such embodiments, feature extraction module 434 may import layers of a pre-trained convolutional network, determine features described in a target layer of the pre-trained convolutional network, and initialize a multiclass fitting model using the features in the target layer and images received for extraction.

In other embodiments, other deep-learning models such as Fast R-CNN can be used for automatic feature extraction. In yet other embodiments, processes such as histogram of oriented gradients (HOG), speeded-up robust features (SURF), local binary patterns (LBP), color histogram, or Haar wavelets may also be used to extract features from a received image.

Server processor 430 may implement image feature extraction module 434 by executing software to create an environment for extracting image features. However, in other embodiments, image feature extraction module 434 may include independent hardware devices with specific architectures designed to improve the efficiency of aggregation or sorting processes. For example, image feature extraction module 434 may be a GPU array configured to partition and analyze layers in parallel. Alternatively, or additionally, image feature extraction module 434 may be configured to implement a programming interface, such as Apache Spark™, and execute data structures, cluster managers, and/or distributed storage systems. For example, image feature extraction module 434 may include a resilient distributed dataset that is manipulated with a standalone software framework and/or a distributed file system.

In some embodiments, A&I server 120 may implement image feature extraction module 434 by configuring CNNs to extract image parameters and identify traces. For instance, feature A&I server 120 may implement the following script:
    dense_layer=layers.get_output(net1.layers_['dense'], deterministic=True)
    output_layer=layers.get_output(net1.layers_['output'], deterministic=True)
    input_var=net1.layers_['input'].input_var
    f_output=t.function([input_var], output_layer)
    f_dense=t.function([input_var], dense_layer)

In other embodiments, A&I server 120 may implement image feature extraction module 434 with methods such as scale-invariant feature transformation, Vector of Locally Aggregated Descriptors (VLAD) encoding, or extractHOGFeatures, among others. Alternatively, or additionally, A&I server 120 may use discriminative features based in the given context (i.e. Sparse Coding, Auto Encoders, Restricted Boltzmann Machines, PCA, ICA, K-means).

For certain embodiments, A&I server 120 may use image extraction module 434 to perform classification models during machine-learning image recognition training. For example, A&I server 120 may perform a density-based spatial clustering of applications with noise (DBSCAN) to classify similar images of similar text to identify patterns in a user's writing. Further A&I server 120 may generate a logistic regression classifier based on the images that have been labeled.

Identification engine 436 may calculate correlations between a received image and stored attributes based on one or more identification models. For example, identification engine 436 may use a character identification model and apply inputs based on a received image or received image features to generate an attributes list associated with the received image. Identification engine 436 may be implemented by server processor 430. For example, server processor 430 may execute software to create an environment to execute models. However, in other embodiments identification engine 436 may include hardware devices configured to carry out parallel operations.

The components of A&I server 120 may be implemented in hardware, software, or a combination of both. For example, although one or more components of A&I server 120 may be implemented as a computer executing instructions embodied in computer software, all or a portion of the functionality of A&I server 120 may be implemented in dedicated hardware.

Figure 5:
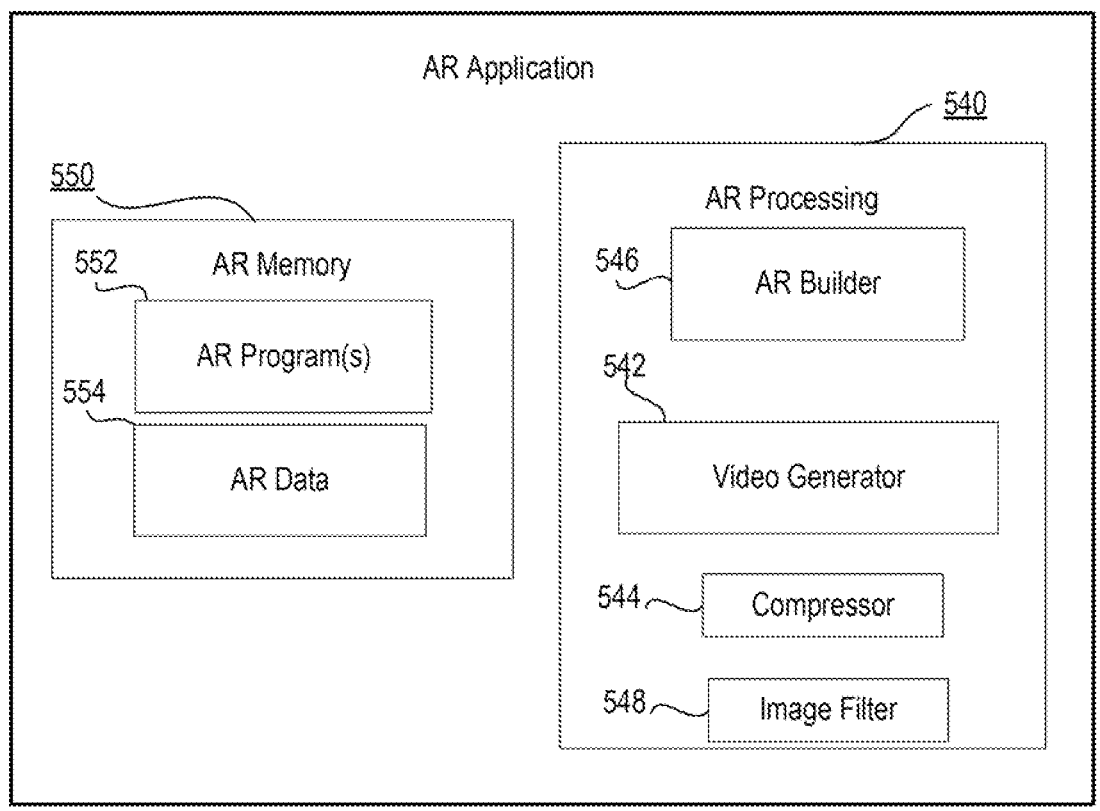
FIG. 5 is a block diagram of an exemplary augmented reality application, consistent with disclosed embodiments.

FIG. 5 is a block diagram of an exemplary AR application 314 (FIG. 3), consistent with disclosed embodiments. AR application 314 may include an AR processing module 540 and an AR memory 550.

AR processing module 540 may include an AR builder 546, a video generator 542, a compressor 544, and an image filter 548. AR builder 546 may be configured to create identification models based on training data. In some embodiments, AR builder 546 may generate AR models that can then generate modified video feeds. For example, AR builder 546 may take a video feed of a natural environment, analyze objects within the field of view and generate an AR model to create a modified video feed. In some embodiments, AR builder 546 may perform operations known in the art to generate 3D AR models. For example, AR builder 546 may build a 3D model of a writing input. In some embodiments, AR builder 546 may generate customized models of objects in an AR viewer (which may include a display showing AR object) based on attributes extracted with a CNN from images. Additionally, or alternatively, AR builder 546 may also perform operations for AR GUIs such as adding animations and/or adding texture. AR builder 546 may employ additional or alternative techniques for constructing AR models.

Video generator 542 may create modified video feeds that can be displayed in augmented reality viewers, as further disclosed in connection to FIGS. 16-20. Video generator 542 may utilize software development kits to generate modified video feeds and/or include computer generated elements in video feeds being displayed in mobile devices 150. Video generator 542 may place virtual objects within camera viewers and adjust the position of the virtual objects in front of the lens.

In some embodiments, video generator 542 may be initialized after AR application 314 identifies objects in a video feed and receives user commands to modify the video. For example, video generator 542 may modify a video feed as a user enters a writing mode and starts moving a writing object. Video generator 542 may then select a target image for modification, add required models (for example models developed by AR builder 546), add GUI settings, and create scripts for adding elements into the video feed. Alternatively, or additionally, video generator 542 may be configured to generate scripts that perform pixel operations in video feeds. For example, video generator 542 may manipulate video feeds to change color of pixels. Furthermore, in some embodiments video generator 542 may utilize video editing tools to include labels or images in a video feed and generate augmented reality views.

Compressor 544 may perform operations to reduce the file size of video feeds and AR GUIs. Compressor 544 may use video codecs to store the separate but complementary data streams as one combined package. Compressor 544 may use lossless or lossy video compression methods. Compressor 544 may use compression techniques used in video coding standards such as discrete cosine transform (DCT) and motion compensation (MC).

Image filter 548 may be implemented to prepare video streams for augmented reality insertion. One challenge in implementing augmented reality navigation tools is the lack of uniformity in the images received from mobile devices. This problem is particularly exacerbated for augmented reality applications that receive images in multiple angles, with varying contrast, and in movement. To enhance accuracy and prevent sending error messages requesting the user to capture and send new images, image filter 548 may enhance specific features that are used by AR builder 546 and video generator 542 when creating the AR video feeds. For example, image filter 548 may enhance contrast or increase color hue in an image to more clearly identify key features in the image and prepare AR models or facilitate video editing.

AR memory 550 may store instructions used by AR processing module 540 to perform operations related to disclosed embodiments. For example, AR memory 550 may store AR programs 552 including instructions that when executed by processor 302 (FIG. 3) cause mobile devices 150 (FIG. 1) to generate modified GUIs. In addition, AR memory 550 may include AR data 554, which may include already-generated AR models. For example, AR data 554 may include AR models of frequently used writing inputs, such as fingers.

Figure 6:
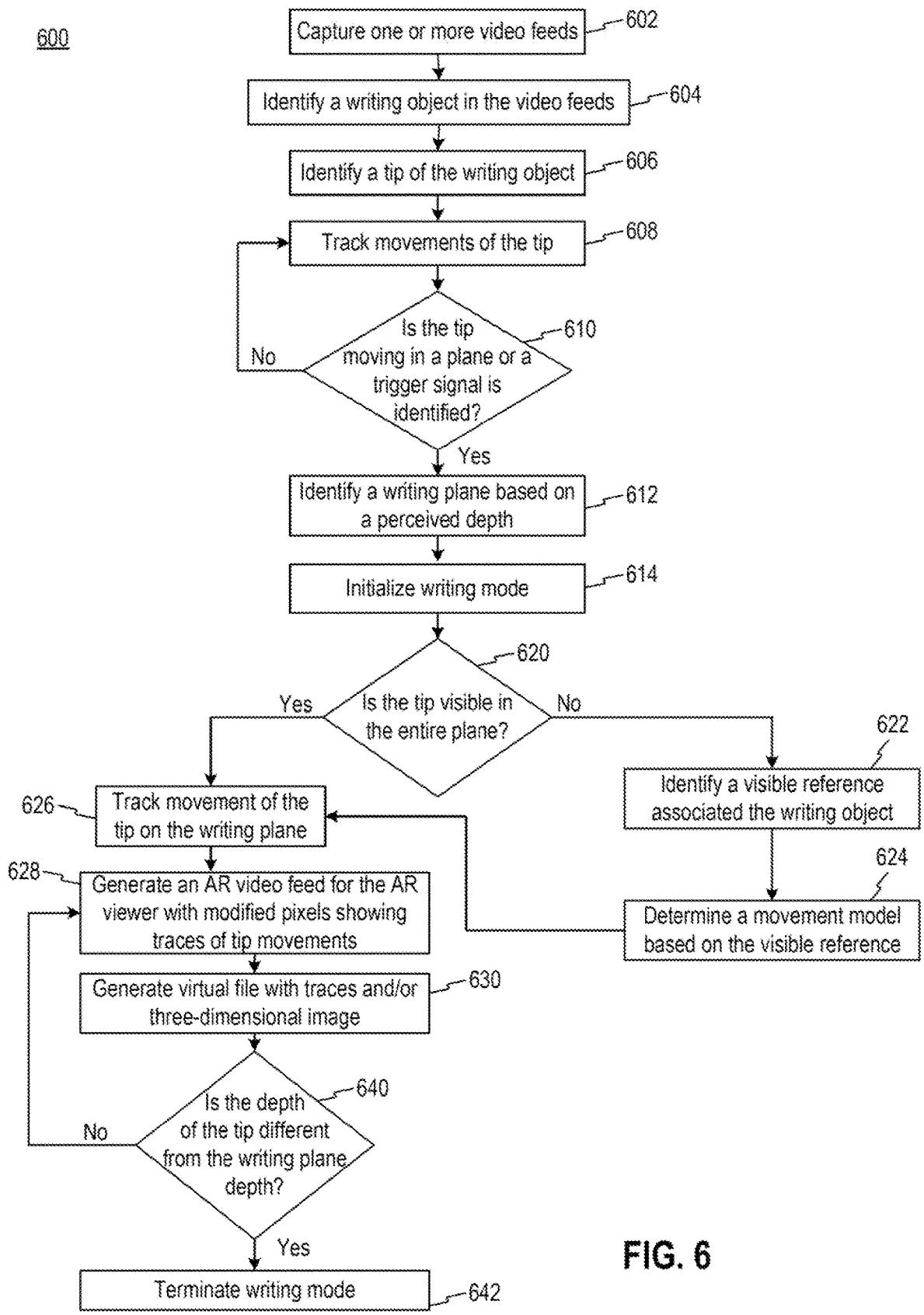
FIG. 6 is a flow chart illustrating an exemplary process for implementing an augmented reality writing mode, consistent with disclosed embodiments.

FIG. 6 is a flow chart illustrating and exemplary process 600 for implementing an augmented reality writing mode, consistent with disclosed embodiments.

In some embodiments, as described below, process 600 may be executed by one or more mobile devices 150. For example, processor 302 (FIG. 3) may operate cameras 320 to capture images and perform steps in process 600. In such embodiments, processor 302 in mobile devices 150 may execute instructions to initiate and operate AR application 314 (FIG. 5) to perform process 600. In other embodiments, process 600 (or parts of process 600) may be performed by A&I server 120 (FIG. 4). For example, while images may be captured using mobile devices 150, image information may be transmitted to A&I server 120 to complete steps of process 600. Further, in some embodiments, multiple elements of system 100 may perform process 600. For example, some steps of process 600 may be performed by A&I server 120, while other steps of process 600 may be performed by mobile devices 150.

In step 602, mobile device 150 may capture one or more video feeds. For example, mobile devices 150 may run AR application 314 which may include an AR viewer. Mobile devices 150 may capture videos displayed in the AR viewer and store them as a sequence of images or as a compressed video file. In some embodiments, mobile device 150 may store the captured video feeds in a cache memory.

In step 604, mobile devices 150 may identify a writing object (stylus, pen, finger, stick, etc.) in the video feed. For example, mobile devices 150 may implement computer-vision algorithms to identify characteristics of objects displayed in an AR viewer and determine if any of the objects could be determined to be a writing object. In some embodiments, to identify a writing object, mobile devices 150 may detect all objects in an image by performing image detection routines such as:

```
from image ai.Detection import ObjectDetection
execution_path = os.getcwd( )
detector = ObjectDetection( )
detector.setModelTypeAsRetinaNet( )
detector.setModelPath( os.path.join(execution_path ,
"resnet50_coco_best_v2.0.1.h5"))
detector. loadModel( )
detections =
detector.detectObjectsFromImage(input_image=os.path.join(execution_pa
th , "image.jpg"), output_image_path=os.path.join(execution_path ,
"imagenew.jpg"))
```

For each detected object, mobile devices 150 may evaluate object characteristics to assess whether they can be a writing object. For example, in step 604 mobile devices 150 may determine objects are writing inputs based on their aspect ratio, previous identifications, and/or connections to a body limb.

In step 606, mobile devices 150 may identify a tip of the writing object. For example, after identifying a writing object in step 604, mobile devices 150 may identify a tip of the writing object. For example, mobile devices 150 may identify a contour of the writing object and use contrast to identify a tip of the object. In some embodiments, mobile devices 150 may use operations of detecting black shapes and define boundary points to identify a contour and use find shape routines to identify a point of the object. For example, in some embodiments mobile devices 150 may implement the following routines in step 606:

```
cnts = cv2.findContours(shapeobject.copy( ), cv2.RETR_EXTERNAL,
cv2.CHAIN_APPROX_SIMPLE)
cnts = imutils.grab_contours(cnts)
cv2.imshow("writ object", ShapeObject)
# loop over the contours
for c in cnts:
# draw the contour and show it
cv2.drawContours(image, [c], -1, (0, 255, 0), 2)
cv2.imshow("Image", image)
  cv2.waitKey(0)
```

Alternatively, or additionally, in step 606 mobile devices 150 may use other objects in the image to identify a tip of the writing object. For example, if the writing object of step 604 is a finger, mobile devices 150 may identify an arm or a hand in the image and identify an opposite side to the hand or arm as the tip of the writing object.

In step 608, mobile devices 150 may track movements of the tip identified in step 606. For example, mobile devices 150 may track the identified tip by bounding box coordinates and compute centroids of the tip of the object in a first position, determining the object moved to a second location, identifying Euclidian distance between bounding boxes in the second location, updating (x, y)-coordinates of the tip in the AR viewer, and registering new objects. For instance, in step 608 mobile devices 150 may perform the following sequence of functions to track the tip:

```
pyimagesearch
init__.py
centroidtracker.py
object_tracker.py
deploy.prototxt
```

In some embodiments, steps 602-608 may be performed passively and in the background to minimize interference with the user's experience. For example, when mobile devices 150 include smart glasses or an AR headset, steps 602-608 may be performed passively in the background without giving notices or interfering with the user's viewer. Therefore, in some embodiments mobile devices 150 do not require activation to track and identify text in user movements. Rather, mobile devices 150 may be capable of tracking motions of the writing input passively, automatically, and based on the input behavior, without any activation or required user input to distinguish non-text segments.

In step 610, mobile devices 150 may determine whether the tip is moving in a plane or a trigger signal. For example, in step 602 mobile devices may capture a pair of video feeds and use stereographic operations to identify the depth of the writing tip. Based on the depth of the writing tip, mobile devices may determine whether the tip is moving on a single plane. If the tip is moving in a single plane, mobile devices 150 may determine that the user is intending to initiate a writing mode. Alternatively, in step 610 mobile devices 150 may determine whether a trigger signal for starting a writing mode has been identified. A trigger signal may include a voice command or a specific or predetermined gesture. For example, microphones in mobile devices 150 may passively listen to user commands and continue process 600 when a user says key words such as "writing" or "start recording."

In some embodiments, mobile devices 150 may make the writing plane determinations based on verifying that the video feed includes two video feeds captured from different positions, performing a stereo image operation using the two video feeds to determine a depth of the tip and the depth of the writing plane, and tracking movements of the tip only when the depth of the tip substantially matches the depth of the writing plane.

If in step 610 mobile devices 150 determines that the moving tip is in a plane or a trigger signal has been identified, mobile device 150 may continue process 600 and move to step 612. However, if in step 610 mobile devices 150 determines that the moving tip is not in a plane or a trigger signal has not been identified, mobile device 150 return to step 608 and continue tracking movements of the tip.

In step 612, mobile devices 150 may identify a writing plane based on a perceived depth of the tip movements. For example, when a tip is moving in a constant depth with respect to cameras of mobile devices 150, mobile devices 150 may identify that depth as the writing plane. In some embodiments, in step 612 mobile devices 150 may use temporal parallax to determine the relative distance of the tip with respect to a plane and/or the camera to identify the writing plane in step 612. Other methods may be used. For example, mobile devices 150 may employ accelerometers 334 (FIGS. 3A-3B) to identify a plane of movement or identify a movement.

In step 614, mobile devices 150 may initialize a writing mode. Initiating a writing mode may include rendering a modified graphical user interface to indicate a user that the writing mode has started. For example, when a writing mode gets initialized a GUI displayed in mobile devices 150 may be modified to include additional icons and or messages, as further described in connection with FIGS. 16-17. In some embodiments, the writing mode may be initialized automatically, without any input from the user. For example, instead of using a switching device or command, some embodiments of the disclosed systems and methods may initialize a writing mode without an activation. In such embodiments, mobile devices 150 may be configured to track the full motion of the writing object and exclude non-text segments by filtering traces during data processing or, as further described below, based on the writing object's movements.

In step 620, mobile devices 150 may determine whether the tip is visible in the entire writing plane. For example, mobile devices 150 may assess whether the tip of the writing input will be obstructed by some object when it is moving on the writing plane. To do so, in some embodiments mobile devices 150 may perform operations of estimating a range of motion of the tip within the writing plane, determining whether the additional objects obscure the tip in the range of motion, identifying an end of the writing object different from the tip. For example, in some embodiments, there may be obstructing objects like object in the foreground of the camera's vision that could prevent tracking of the tip at the writing plane. Alternatively, or additionally, an object associated with the writing object and the tip could block visibility and block tracking. For example, when a writing object is a stick of a pencil, the hand holding the stick or pencil may obstruct visibility of the tip at the writing plane depth. In such situations, mobile devices 150 may be configurable to determine that the tip of the object (i.e., the tip of the pencil) is not visible in the entire plane.

If in step 620 mobile devices 150 determine that the tip is not visible in the entire writing plane (step 620: No), mobile devices 150 may continue to step 622 and identify a visible reference associated with the writing object. For example, if the tip of the pencil is not visible in the entire plane (e.g., it could be blocked by the writing hand), mobile devices 150 may identify the other end of the pencil (e.g., the eraser) as a visible reference that will be visible above the writing plane. As another example, if the writing object is a finger but the body of the writer block the tip in some portions of the writing plane, mobile devices 150 may identify a shoulder or and elbow as a visible reference associated with the writing object in step 622. Additionally, or alternatively, in certain embodiments the visible reference may be a shadow of the writing object.

In step 624, mobile devices 150 may determine a movement model based on the visible reference. In some embodiments, once a visible reference is identified in step 622, mobile devices 150 may load and/or retrieve models that associate movements of the tip with movements of the visible reference. For example, if the writing object is a pencil and the visible reference is the pencil's eraser, in step 624 mobile devices 150 may retrieve or determine a movement model that correlates movements of the eraser with movements of the tip of the pencil. The model may indicate that, for example, when the visible reference moves down, the pencil tip is moving up by a fraction of the eraser's movement. Similarly, when the eraser moves sideways, the model indicate the tip is moving in an opposite direction. The movement model of step 624 may be based on the type of object and the holding position. Further, in some embodiments the movement model may correlate movements of the visible reference and the tip using Kalman filters, probabilistic appearance models, and/or object-shadow association. After determining or retrieving a movement model based on the visible reference in step 624, mobile devices 150 may continue to step 626 and start tracking movement of the tip in the plane using the movement model.

If in step 620, mobile devices 150 determine that the tip is visible in the entire plane (step 620: Yes), mobile devices 150 may skip steps 622 and 624 and continue directly to step 626. In step 626, mobile devices 150 may track movement of the tip on the plane. While in the writing mode, mobile devices 150 may record movements of the tip at the writing plane. In some embodiments, limiting movements of the writing tip at the writing plane may limit the information collected and simplify later data processing. For example, if the tip moves out of the writing plane, mobile devices 150 may consider that the user does not intend the out of plane movements to be recorded. Like when a writer lifts the pen from the paper, the user may be pausing. Further, isolating traces to be recorded only when they are produced at the writing plane could improve accuracy of OCR and/or facilitate image identification operations.

In step 628, mobile devices 150 may generate an AR video feed or GUI for the AR viewer with modified pixels showing traces of tip movements. As further disclosed in connection with FIGS. 16-20, mobile devices may generate a GUI that shows traces of the writing tip on the writing plane to show text that has been generated by the user. For example, in step 628 mobile devices 150 may generate an AR view that shows changes the color of pixels in the AR viewer that have been "touched" by the writing tip. Other embodiments, however, may use GUIs that change no pixels in the video feed. In yet other embodiments, no GUI may be generated, and the user may not be presented with any display of an AR view. For example, in some embodiments mobile devices 150 may simply track movements of the writing input and employ postprocessing to exclude non-text segments. Such embodiments may be designed to minimize computer and memory usage and, instead, focus processing resources on tracking the writing input for later analysis.

In step 630, mobile devices 150 may generate a virtual file with traces and/or three-dimensional image. For example, mobile devices 150 may perform an OCR operation to generate a virtual file that includes characters and/or text identified from the traces. Such virtual file may be a text file, a Portable Document Format, a word file, among other text-based files. Alternatively, or additionally, mobile devices 150 may generate a virtual file with an image. For example, mobile devices 150 may generate a virtual file with an image of the tracked movements of the tip on the writing plane. In such embodiments, mobile devices 150 may generate a bitmap that shows the pixels in the path of the writing tip. For instance, the virtual file may include a plurality of the virtual images or bitmaps. Thus, in certain embodiments the virtual file may include a JPEG, and EPS, a BMP, or similar image files. In certain embodiments the virtual file of step 630 may include a vector or a raster file that records different traces of the writing object. Additionally, or alternatively, in some embodiments the virtual file may include three-dimensional vectors storing each substantially continuous movement of the tip as one vector.

In step 640, mobile devices 150 may determine whether the tip is no longer moving on the writing plane. Like in step 610, mobile devices 150 may use two or more video feeds to identify where the depth of the tip movements. Based on the depth of the writing tip, mobile devices may determine whether the tip is no longer moving on a single plane after. If the tip is moving in no longer moving in a single plane after a threshold time, mobile devices 150 may determine the user is intending to terminate the writing mode. Alternatively, in step 640 mobile devices 150 may determine whether a trigger signal for terminating a writing mode has been identified. Like when initiating the writing mode, the trigger signal may include a voice command, or a specific gesture that initiates the writing mode. For example, microphones in mobile devices 150 may passively listen to user commands during the writing mode and terminate the writing mode when a user says key words such as "stop recording" or "done."

If in step 640 mobile devices 150 determines that the moving tip is still moving along the writing plane (step 640: No), mobile device 150 may return to step 626 and continue tracking movements of the tip on the writing plane. However, if in step 640 mobile devices 150 determines that the moving tip is no longer moving along the writing plane (Step 640: Yes), mobile devices may continue to step 642 and terminate the writing mode. In some embodiments, terminating the writing mode may include modifying the GUI shown to a user. For example, terminating the writing mode may revert any modification of the video feed and show an unmodified display. Additionally, terminating the writing mode may eliminate or modify certain icons in the GUI and display new icons. As further described in connection to FIGS. 16-20, terminating the writing mode may display windows or icons showing options to send the virtual file of step 360 to other devices and/or send corrections to train the OCR processes. Additionally, or alternatively, terminating the writing mode may forward the virtual file to other devices or upload them to cloud services.

Figure 7:
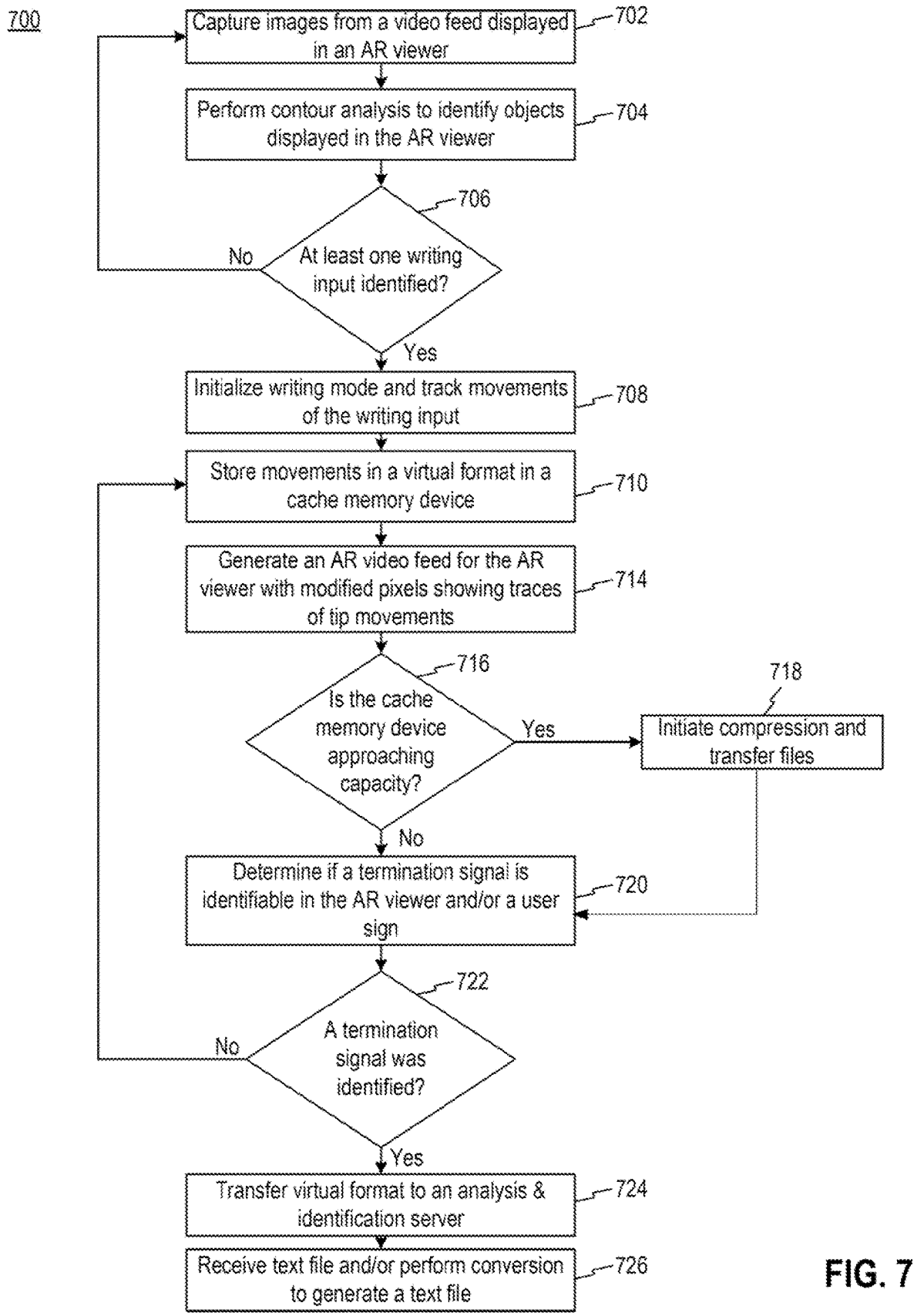
FIG. 7 is a flow chart illustrating an exemplary process for generating and transferring virtual files with writing inputs, consistent with disclosed embodiments.

FIG. 7 is a flow chart illustrating an exemplary process 700 for generating and transferring virtual files with writing inputs, consistent with disclosed embodiments. In some embodiments, as described below, process 700 may be executed by one or more mobile devices 150, such as mobile device 150-1. For example, processor 302 (FIG. 3) may operate cameras 320 to capture images and perform steps in process 700. In such embodiments, processor 302 in mobile devices 150 may execute instructions to initiate and operate AR application 314 (FIG. 5) to perform process 700. In other embodiments, process 700 (or parts of process 700) may be performed by A&I server 120 (FIG. 1). For example, while images may be captured using mobile devices 150, image information may be transmitted to A&I server 120 to complete steps of process 700. Further, in some embodiments, multiple elements of system 100 may perform process 700.

In step 702, mobile devices 150 may capture images from a video feed displayed in an AR viewer. For example, mobile devices 150 running AR application 314 (FIG. 5) may be displaying an AR viewer that shows images captured with the cameras 320 (FIG. 3).

In step 704, mobile devices 150 may perform contour analysis to identify objects displayed in the AR viewer. For example, mobile devices 150 may employ OpenCV to identify contours of objects in the captured image, using for example a findContour( ). In such embodiments, processor 302 may be configured perform operations like loading an image, converting to gray scale, finding canny edges, and finding contours using operations such as:

contours,      hierarchy=cv2.findContours(edged,
    cv2.RETR_EXTERNAL,
    cv2.CHAIN_APPROX_NONE)

Alternatively, or additionally, in step 704 mobile devices 150 may use an approximation method to identify contours of images in the AR viewer. In such embodiments, mobile devices 150 may identify contours by determining intensities of pixels and storing coordinates of the boundary of a shape to then approximate the contour based on intensity and coordinate correlation. For instance, mobile devices 150 may use a "cv2.CHAIN_APPROX_NONE" file that stores all the coordinates, identify lines based on similarity of intensities, and generate a second file "cv2.CHAIN_APPROX_SIMPLE" that removes redundant points and compresses the contour, thereby saving memory.

In step 706, mobile devices 150 may analyze object contours and their associated speeds to determine if at least one object is a writing input. Determination of writing inputs may be based on predetermined contour rules of length, straightness, or object identification. Further, the determination of the writing input may be based on the speed of movement of the objects in the field of view.

For example, in step 706 mobile devices 150 may determine that objects having an aspect ratio of 10:1 (i.e., 10 times longer than wider) or more can be identified as a writing object. Alternatively, or additionally, the rules to identify writing objects may include object straightness and/or surface variations. Further, in certain embodiments, mobile devices 150 may identify writing inputs by identifying object patterns in the AR viewer. In such embodiments, mobile devices 150 may identify patterns of a pencil, pen, or finger, as a writing input.

Additionally, or alternatively, in step 706 mobile devices 150 may identify writing objects based on the object's speed of movement. In such embodiments, if multiple "pointed" objects are identified in the AR viewer (e.g., multiple objects with a long aspect ratio are identified in the field of view), mobile devices 150 may compare the objects' speeds of movement to identify a writing input. Because writing movements are frequently fast, mobile devices 150 may identify a pointed object moving fastest as the writing input. For example, a user writing on air (i.e., aerial writing) normally moves a writing object fast. Thus, mobile devices 150 may use speed of object movement to identify a writing object in step 706. Indeed, as further described in connection with FIG. 9, mobile devices 150 may discard objects that are not moving at a minimum speed from writing input candidates because even if the object meets requirements of aspect ratio or length, if the object is not moving it is likely unintended to be a writing input.

If in step 706 mobile devices 150 determine that there is no writing input identifiable in the AR viewer (step 706: No), mobile devices 150 may return to step 702 and continue capturing images. In some embodiments, the cycle defined in steps 702-706 may be performed in the background and maybe transparent for a user. However, if in step 706 mobile devices 150 determine that there is at least one writing input identifiable in the AR viewer (step 706: Yes), mobile devices 150 may continue to step 708.

In step 708, mobile devices 150 may initialize a writing mode and extract tracking movements of the identified writing input. For example, as previously described in connection to FIG. 6, mobile devices 150 may track the movement of a tip of the writing object when it moves in a writing plane.

In step 710, mobile devices 150 may store movements in a virtual file in a cache memory device. For example, mobile devices may generate a virtual file, like a raster file or a JPEG, that stores the movements captured in step 708. In some embodiments, mobile devices 150 may store multiple virtual files, including multiple images, bit maps, vectors, or the like. In some embodiments, the cache memory may be a specialized memory on mobile devices 150 for quick access and storage. For example, mobile devices 150 may use a high-speed memory as cache to speed up and synchronize image capturing and analysis. In certain embodiments, the cache memory used in step 710 may be a fast memory type, like a 3D V-NAND, that may act as a buffer.

In step 714, mobile devices 150 may generate an AR GUI for the AR viewer with modified pixels showing traces of tip movements. For example, mobile devices 150 may generate MR views that show live images captured by cameras of mobile devices 150 that are modified to show the tracked movements of the writing input. For example, if the camera captures an image of a brick wall, in step 714 mobile devices 150 may modify the video feed in real time to include traces that match movements of the writing input.

In step 716, memory devices 150 may determine whether the memory used to buffer, or store tracked movements is approaching capacity. For example, memory device 150 may determine whether the cache memory of step 710 is approaching capacity. If mobile devices 150 determine that the memory device is approaching capacity, mobile devices 150 may continue to step 718 and initiate a compression process and transfer files. In step 718 mobile devices 150 may transferred compressed virtual files to a local memory device or may send it to a processing device, such as A&I server 120. But if in step 716 mobile devices 150 determine that the memory device is not approaching capacity (step 716: No), mobile devices 150 may continue to step 720 and determine if a termination signal is identifiable in the AR viewer or if a user has triggered a termination signal. For instance, like in step 640 (FIG. 6), in step 720 mobile device 150 may listen to voice commands for the user or identify a movement of the writing object as a termination signal.

If a termination signal has not been identified (step 722: No), mobile devices 150 may return to step 710 and continue storing movements of the writing input in the virtual file. However, if a termination signal was identified (step 722: Yes), mobile devices 150 may continue to step 724 and transfer the virtual file for processing. For example, in step

724 mobile devices 150 may send the captured virtual files with the tracked movements of the virtual object to A&I server 120. In such embodiments, the virtual file may be tailored to minimize network congestion while providing enough information to the server to perform image analysis, like OCR. For example, instead of transmitting complete images, virtual files transmitted in step 724 may only include differential images. Also, virtual files may only include coordinates of the movements of the writing object, instead of an image. In such embodiments, the virtual file may be a compressed text file that includes periodic coordinates of the writing object that can be used to reconstruct the writing object's movements.

In step 726, mobile devices 150 may receive a text file and/or perform OCR operations to analyze the images and identify characters and text. In embodiments in which the data analysis is performed remotely, in step 726 mobile devices 150 may receive a text file of the image analysis product. For instance, A&I server 120 may send mobile devices a text file with characters identified in virtual files of step 724. In other embodiments, local processors, like processor 302, may analyze virtual files to perform OCR operations.

As further described in connection with FIG. 10, in some embodiments the OCR process may involve machine-learning techniques to improve accuracy of the identified text. OCR processes are normally accurate for standard type fonts, but they are less accurate for handwritten text. Thus, OCR operations of step 726 may include ICR (Intelligent Character Recognition). In such embodiments, mobile devices 150 may employ machine-learning methods to associate patterns with characters. For instance, mobile devices 150 may employ neural networks, like CNNs, to automatically update recognition databases correlating handwriting patterns with characters.

In some embodiments, mobile devices 150 and/or A&I server 120 may employ ICR processes tailored for a specific user. For instance, the image recognition process may use the user's feedback to create OCR and ICR tables that correlate patterns with specific characters. In such embodiments, mobile devices 150 performing process 700 may automatically convert AR hand-written data into searchable digital files, avoiding laborious manual keying and can be more accurate than traditional human data entry.

Moreover, for certain applications mobile devices 150 and/or A&I server 120 may not only use OCR and ICR but attempt more accurate image recognition using Intelligent word recognition (IWR). With IWR mobile devices 150 and A&I server 120 may extract cursive handwriting as well because, while ICR performs recognition on the character-level, IWR may capture full words or phrases. In such embodiments mobile devices 150 may process free-form movements. Such combination of detection methods in process 700 may improve the technical field of AR applications and enable applications that eliminate manual entry of handwritten data and automatically generate searchable files through the AR/MR environment.

In some embodiments, a processor may perform process 700 with operations of detecting contours for each one of the objects, calculating lengths and aspect ratios of the objects based on respective contours, determining whether at least one of the objects has a length above a threshold length and an aspect ratio above a threshold aspect ratio, and upon determining that the object has the length above the threshold length and the aspect ratio above the threshold aspect ratio, identifying the object as a writing object. In such embodiments, process 700 may also include operations of upon determining that none of the objects has a length above the threshold length and an aspect ratio above the threshold aspect ratio, identifying a limb by analyzing images from the video feed using a pre-trained convolutional neural network, determining whether the limb is contacting one of the objects, and identifying the object contacting the limb as the writing object.

Figure 8:
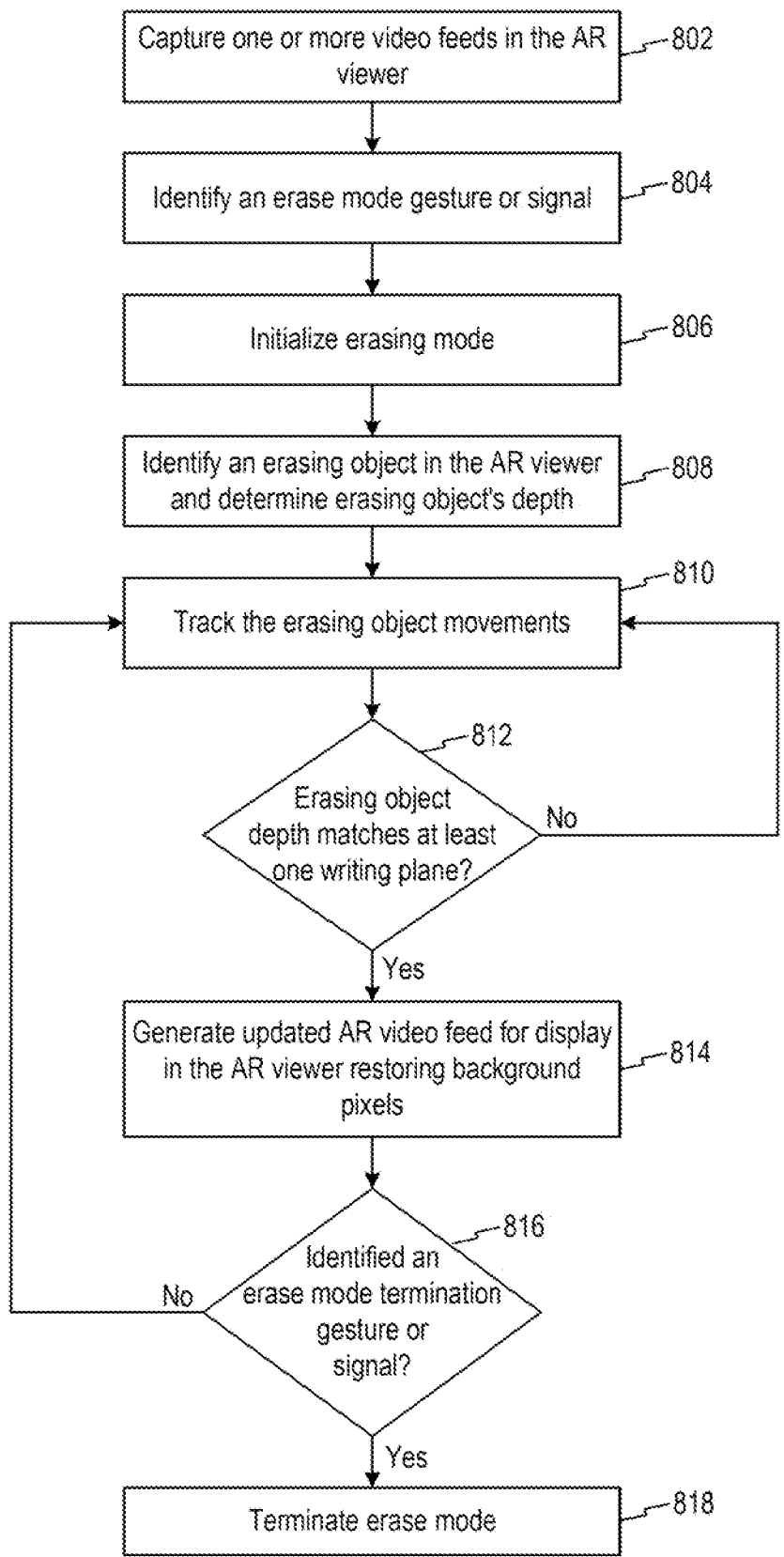
FIG. 8 is a flow chart illustrating an exemplary process for implementing an augmented reality erasing mode, consistent with disclosed embodiments.

FIG. 8 is a flow chart illustrating an exemplary process 800 for implementing an AR erasing mode, consistent with disclosed embodiments. In some embodiments, as described below, process 800 may be executed by one or more mobile devices 150, such as mobile device 150-1. In other embodiments, process 800 (or parts of process 800) may be performed by A&I server 120 (FIG. 1). Further, in some embodiments, multiple elements of system 100 may perform process 800.

In step 802, mobile devices 150 may capture one or more video feeds in the AR viewer. Like in steps 602 (FIG. 6) and 702 (FIG. 7), mobile devices 150 may capture images captured by cameras 320.

In step 804, mobile devices 150 may identify an erase-mode gesture or signal. The erase-mode gesture may be prestored in a local memory and include a specific pattern. For example, in some embodiments the erase-mode gesture may include a specific patter of the writing input. In such embodiments, the erase-mode gesture may include a line going backwards. Alternatively, or additionally, the erase-mode gesture may include the appearance of a different object. For example, the appearance of an opened hand in an AR viewer may be identified as an erase-mode gesture. Further, in some embodiments the erase-mode gesture may be the based on the writing input. For instance, flipping the writing input may be identified as an erase-mode gesture. Such type of erase-mode gestures may improve UX by resembling natural behavior. Alternatively, or additionally, in step 804 mobile devices 150 may identify an erase-mode signal, such as a voice command.

In step 806, mobile devices 150 may initialize an erase mode. As further described in connection with FIG. 20, when initializing an erase mode, mobile devices 150 may generate an AR GUI indicating that an erase mode has been activated. For example, when switching to an erase mode from a writing mode, mobile devices 150 may substitute icons displayed on the GUI and/or change colors of certain pixels in the GUI.

In step 808, mobile devices 150 may identify an erasing object in the AR viewer. Further mobile devices 150 may also determine the erasing object's depth. For example, mobile devices 150 may identify contours of objects in the AR viewer and use identification rules to determine which object could be an erasing object. The identification rules may include that substantially horizontal and thin objects should be identified as erasing objects. Alternatively, or additionally, identification rules may indicate that substantially circular objects may be identified as erasing objects. Further, for some embodiments, mobile devices 150 may identify certain objects as erasing objects based on attributes identified with a CNN. For example, if mobile devices 150 determines an opened hand is in an AR viewer, mobile devices 150 may determine the opened hand is the erasing object.

In step 810, mobile devices 150 may track the erasing object movements. Using similar techniques and methods as the ones described to track writing objects in connection with FIG. 6, mobile devices 150 may track movements of the erasing object and create virtual files that store the movements of the erasing object.

In step 812, mobile devices 150 may determine whether the erasing object depth matches at least one writing plane. Because a user may be writing in multiple writing planes, in step 812 mobile devices may determine the depth of the erasing object to determine whether it matches a writing plane, like the ones identified in step 612 (FIG. 6). In some embodiments, mobile devices 150 may identify the depth of the erasing object using stereographic operations using views from two or more cameras.

If mobile devices 150 determine that the erasing object depth does not match any writing plane (step 812: No), mobile devices 150 may determine the user does not intend to erase writing tracks and return to step 810 and simply continue tracking the erasing object movements. However, if mobile devices 150 determine that the erasing object depth matches a writing plane (step 812: Yes), mobile devices 150 may determine the user intends to erase writing tracks and continue to step 814.

In step 814, mobile devices 150 generate an updated AR video feed or GUI that restores the background pixels previously covered by writing tracks in the AR viewer. For example, if the AR viewer was showing a modified view that included writing tracks, in step 814 mobile devices 150 may clear the pixels so they show again the natural view of the AR viewer. In addition, in some embodiments mobile devices 150 may update icons displayed in the AR viewer as the erasing object moves. For example, mobile devices 150 may modify the content of icons in the AR viewer as the erasing object moves.

In step 816, mobile devices 150 may determine if it has identified an erase-mode termination gesture or signal. The erase-mode termination signal may be a specific pattern of the erasing object, like a circular motion or moving the erasing object outside the field of view of the AR viewer. Alternatively, or additionally, the erase-mode termination signal may include a voice command.

If mobile devices 150 determines an erase-mode termination gesture of signal has not been identified (step 816: No), mobile devices 150 may return to step 810 and continue tracking the erasing object movements. However, if mobile devices 150 determines a termination gesture or signal has been identified (step 816: Yes), mobile devices 150 may continue to step 818 and terminate the erasing mode.

In some embodiments, terminating the erasing mode in step 818 may include modifying the GUI shown in an AR viewer to indicate that the erasing mode has been deactivated. For example, mobile devices 150 may change the icon, colors, or backgrounds in AR viewer in step 818.

In some embodiments, a processor may perform a process similar to process 800 by performing operations of detecting an erase-mode signal, identifying an erasing object in the video feed based on a contour of the erasing object, modifying the filtered video by removing objects different than the erasing object from the video feed, identifying an erasing path by performing the boundary tracing operation on the filtered video, modifying the tracing image by clearing the highlighted pixels in the erasing path; and modifying the augmented reality video by combining the tracing image with the video feed.

Figure 9:
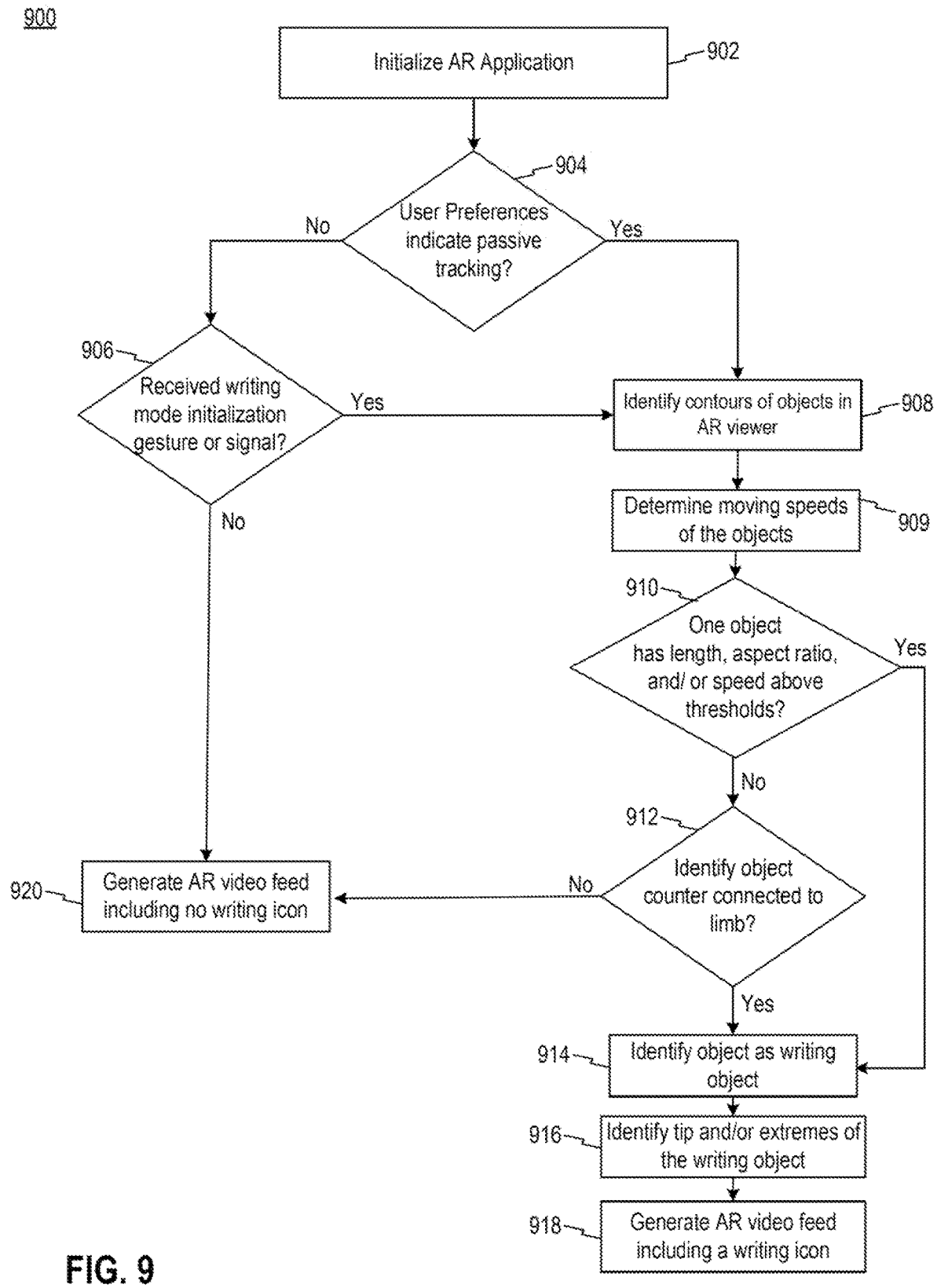
FIG. 9 is an exemplary flow chart illustrating a writing object identification process, consistent with disclosed embodiments.

FIG. 9 is an exemplary flow chart illustrating a writing object identification process 900, consistent with disclosed embodiments. In some embodiments, process 900 may be part of processes 600 (FIG. 6) or 700 (FIG. 7). For example, mobile devices 150 may perform process 900 to identify a writing object in step 606. Alternatively, or additionally, mobile devices may perform process 900 during process 700, to identify writing objections in step 706.

In some embodiments, as described below, process 900 may be executed by one or more mobile devices 150. For example, processor 302 (FIG. 3) may operate cameras 320 to capture images and perform steps in process 900. In other embodiments, process 900 (or parts of process 900) may be performed by A&I server 120 (FIG. 4). For example, while images may be captured using mobile devices 150, image information may be transmitted to A&I server 120 to complete steps of process 900. Further, in some embodiments, multiple elements of system 100 may perform process 900.

In step 902, mobile device 150 may initialize an AR Application. For example, mobile devices 150 may initialize or execute AR application 314 (FIG. 5).

In step 904, mobile devices 150 may determine whether user preferences indicate passive tracking. For example, mobile devices 150 may determine whether a local memory includes user preferences for AR application 314 and whether the user preferences indicate passive tracking. For certain embodiments, users may prefer to have passive tracking of objects, so they do not need to actively initialize a writing mode but instead have processor 302 automatically initialize active modes whenever a writing object is identified. Such arrangements may create seamless user experience that incentivizes use of the AR tools. In other embodiments, however, users may prefer to save computing resources and have preferences for no passive tracking.

If in step 904 mobile devices 150 determine that the user preferences do not indicate passive tracking (step 904: No), mobile devices 150 may continue to step 906 and determine whether a user has initialized a writing mode with an initialization signal (like a voice command). If the user has not initialized the writing mode (e.g., the user has not provided any signal), mobile devices 150 may continue to step 920 and generate an AR video feed that includes a no-writing mode icon. However, if the user has provided an initialization signal, mobile device 150 may determine the user desires to start tracking movements to store a writing input and continue to step 908.

If in step 904 mobile devices 150 determine that the user preferences indicate passive tracking (step 904: Yes), mobile devices 150 may continue to step 908 and identify contours of object in the AR viewer. Using methods described in connection with FIG. 7, mobile devices 150 may identify and analyze contours of objects in the AR viewer.

In step 909, mobile devices 150 may determine moving speeds of the objects and/or contours identified in step 908. For example, mobile devices 150 may calculate velocity of identified objects by multiplying the distance of centroids between a previous frame and a current frame, the frame rate of the captured video, and the scale of the unit is meter/pixel. In such embodiments, mobile devices 150 may identify centroids or tips of the contours identified in step 908 and calculate their moving speeds by tracking the centroids or tips as a function of the frames with operations such as:

$$vel\_pix = sqrt(sum((points-oldPoints) \hat{\ } 2,2));$$

$$vel = vel\_pix * frameRate * scale; \% \ pixels/frame*frame/seconds*meter/pixels, \text{ where vel is the tracked speed of the object.}$$

In step 910, mobile devices 150 may determine whether one of the objects in the AR viewer has a length, aspect ratio, and/or speed above a threshold. For example, based on the contour shape, mobile devices may determine the aspect ratio (e.g., ratio between the length and the width) of each object in the AR viewer. Mobile devices 150 may then determine whether the aspect ratio is above a threshold of, for example, 10:1. In this way, mobile devices 150 may identify elongated objects that could be normally be used as writing objects. Further, mobile devices may identify writing objects based on their length. For example, objects that appear to have a length of at least 10 cm may be considered as writing objects, but smaller objects would be neglected. Additionally, or alternatively, mobile devices 150 may determine writing objects based on their speed. In such embodiment, mobile devices 150 may determine whether objects are moving at a minimum speed to be considered writing inputs. For example, mobile devices 150 may identify objects that are moving at least at 1 cm/s as potential writing objects. In contrast, objects moving at lower speeds may be discarded because speeds lower than 1 cm/s are insufficient for a writing input. In some embodiments, the threshold ratio, length, and speed may be adjusted by the user to select the type of object that would trigger a writing object identification.

If mobile devices determine that the objects do not have length and/or aspect ratio above the thresholds (step 910: No), mobile devices 150 may continue to step 912. In step 912, mobile devices 150 may perform a second attempt to identify a writing object. This time by identifying limbs in the AR viewer and identifying an object connected to a limb as the writing object. Because a writing object can be normally connected to an arm or hand and if the user is holding the writing object their contours would be connected, mobile devices 150 may use limbs to identify writing objects. Thus, in some embodiments mobile devices 150 may identify limbs in an AR viewer.

If in step 912 mobile devices 150 do not identify a limb (step 912: No), mobile devices 150 may determine there are no writing objects based on the contours of objects in the AR viewer. Thus, mobile devices 150 may continue to step 920 and generate an AR video feed or GUI that indicates there is no writing object and no writing operation can be initiated. Alternatively, in some embodiments, in step 920 mobile devices 150 may simply display an unaltered video feed in the AR viewer. However, if in step 912 mobile devices 150 determines that there is a limb in the AR viewer, mobile devices 150 may continue to step 914.

In step 914, mobile devices 150 may identify an object connected to the identify limb as the writing object. This second tier of identification based on objects being connected to the limb may facilitate identification of objects when they are obstructed by the limb that is holding them. Hence, the identification of writing objects through process 900 may be more efficient than simple image recognition.

In step 916, mobile devices 150 may identify a tip and/or extremes of the writing object. In step 918, mobile devices 150 may generate an AR GUI that modifies a video feed to include a writing icon. For example, in some embodiments when mobile devices recognize a writing icon, mobile devices may automatically initiate a writing mode. To give notice to a user of mobile devices 150 that the writing mode has initiated, and a writing object is being tracked, mobile devices 150 may generate AR GUIs that include icons, notices, or modified pixels to indicate a writing mode. For example, in step 918 mobile devices 150 may display writing icons, as further described in connection with FIG. 16-18.

Figure 10:
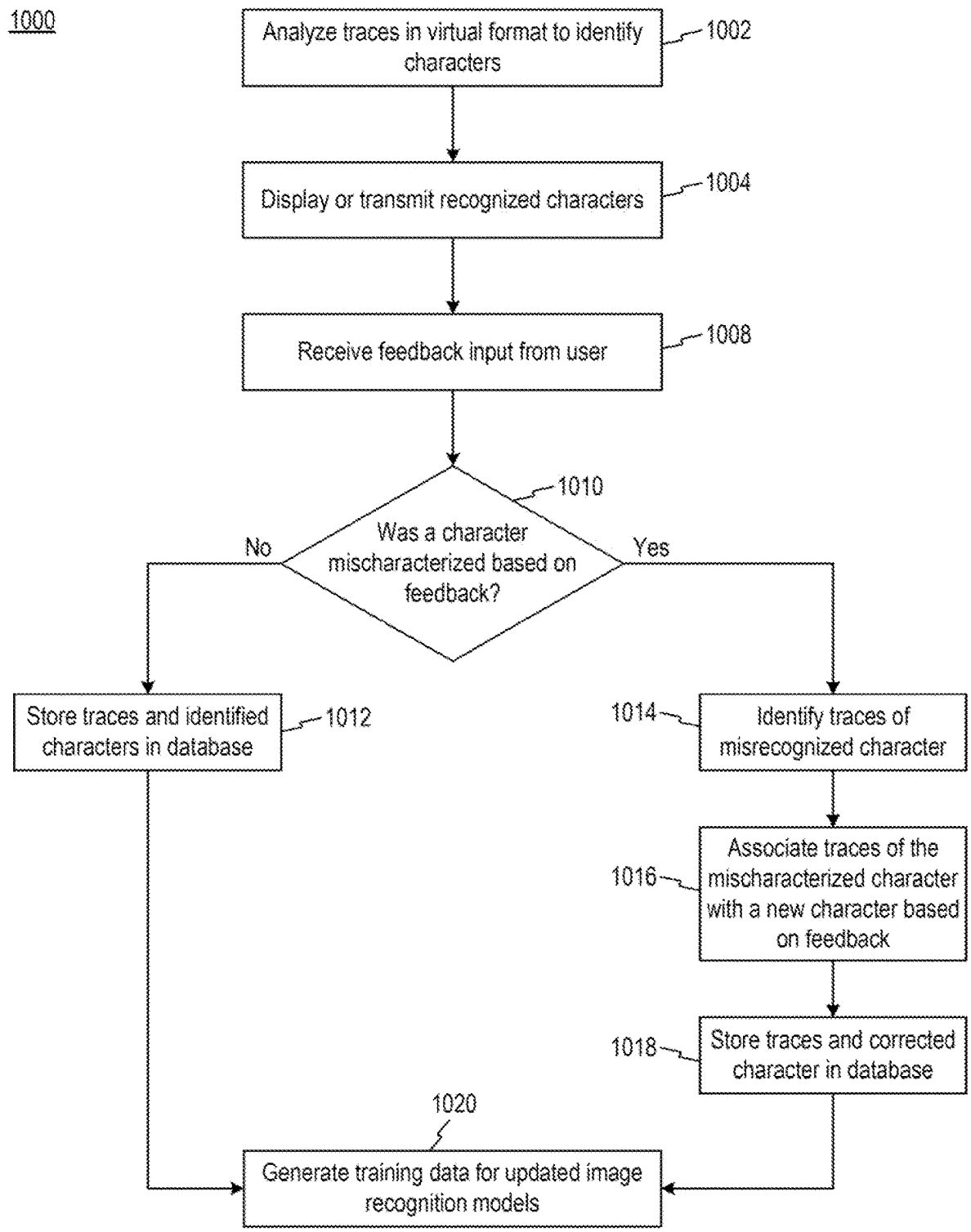
FIG. 10 is an exemplary flow chart illustrating an image recognition training process, consistent with disclosed embodiments.

FIG. 10 is an exemplary flow chart illustrating an image recognition training process 1000, consistent with disclosed embodiments. In some embodiments, elements of system 100 may perform process 1000 to improve accuracy of OCR, ICR, or IWR processes. For example, A&I server 120 may perform process 1000 to customize correlations between patterns and characters. As described below, process 1000 may be executed by A&I server 120. For example, when mobile devices 150 transmit virtual files to A&I server 120 for image recognition, A&I server 120 may perform process 1000. In other embodiments, however, processor 302 in mobile devices 150 may execute instructions to perform process 1000. Further, in some embodiments, multiple elements of system 100 may perform process 1000. For example, some steps of process 1000 may be performed by A&I server 120, while other steps of process 1000 may be performed by one or more mobile devices 150.

In step 1002, A&I server 120 may analyze traces in virtual file to identify characters. For example, A&I server 120 may receive a virtual file from mobile devices 150 in step 724 (FIG. 7). In such embodiments, A&I server 120 may analyze the virtual file to identify traces and correlate them with characters in step 1002.

In step 1004, A&I server 120 may generate a GUI to display or may transmit recognized characters. For example, A&I server 120 may generate an AR GUI that shows the results of the analysis of step 1002 to show the characters and/or word that have been identified. Alternatively, in some embodiments A&I server 120 may send a text file to mobile devices 150 with the results of the image recognition operations.

In step 1008, A&I server 120 may receive feedback input from user. For example, A&I server 120 may receive a voice recording indicating the OCR or ICR was inaccurate. The feedback may also include a corrected text file with the intended text of the user. In some embodiments, feedback received in step 1006 may be received immediately (i.e., within a few seconds) after step 1004. In other embodiments, the user may provide feedback later, through a different communication mediation, like an email or a feedback from.

In step 1010, A&I server 120 may determine whether a character was mischaracterized based on feedback. For example, A&I server 120 may compare the feedback file with the results from analysis of step 1002 and identify differences. Further, in embodiments in which the user provides feedback using a voice recording, in step 1010 A&I server 120 may transcribe the recording and then compare the feedback information with the analysis results.

If in step 1010 A&I server 120 determines that there were no mischaracterized characters based on the feedback (step 1010: No), A&I server 120 may continue to step 1012 and store traces and identified characters in a database. However, if in step 1010 A&I server 120 determines that at least one character was mischaracterized based on the feedback (step 1010: Yes), A&I server 120 may continue to step 1014.

In step 1014, A&I server 120 may identify traces of the misrecognized characters. For example, A&I server 120 may dissect the traces and identify patterns using CNNs. In step 1016, A&I server 120 may associate traces of the mischaracterized character with a new character based on the user feedback. For example, A&I server 120 may determine that the feedback is indicating that a pattern of traces was mischaracterized for the character "B" when the feedback indicates it should have been identified as character "8." In step 1016 A&I server 120 may relate the mischaracterized trace to character "8" instead of character "B." A similar process may also be performed for IWR. For example, if the feedback indicates that a set of traces were identified as "Hello" but should have been identified as "Halo," in step 1016 A&I server 120 may associate the traces or the attributes (as identified by the CNN) of the mischaracterized word for a different work. A&I server 120 may store these relationships of traces, extracted attributes, and characters or words in a database in step 1018.

Regardless of whether a character was mischaracterized, A&I server 120 may continue to step 1020 and generate training data (of either positive or negative correlations) for updated image recognition models. As further describe in connection to FIG. 14, in some embodiments A&I server 120 may leverage machine learning methods to enhance the accuracy of the OCR, ICR, or IWR processes. In step 1020, A&I server 120 may collect both mistakes and accurate identifications to feed machine learning models to improve image identification processes and traces to characters correlations.

Figure 11:
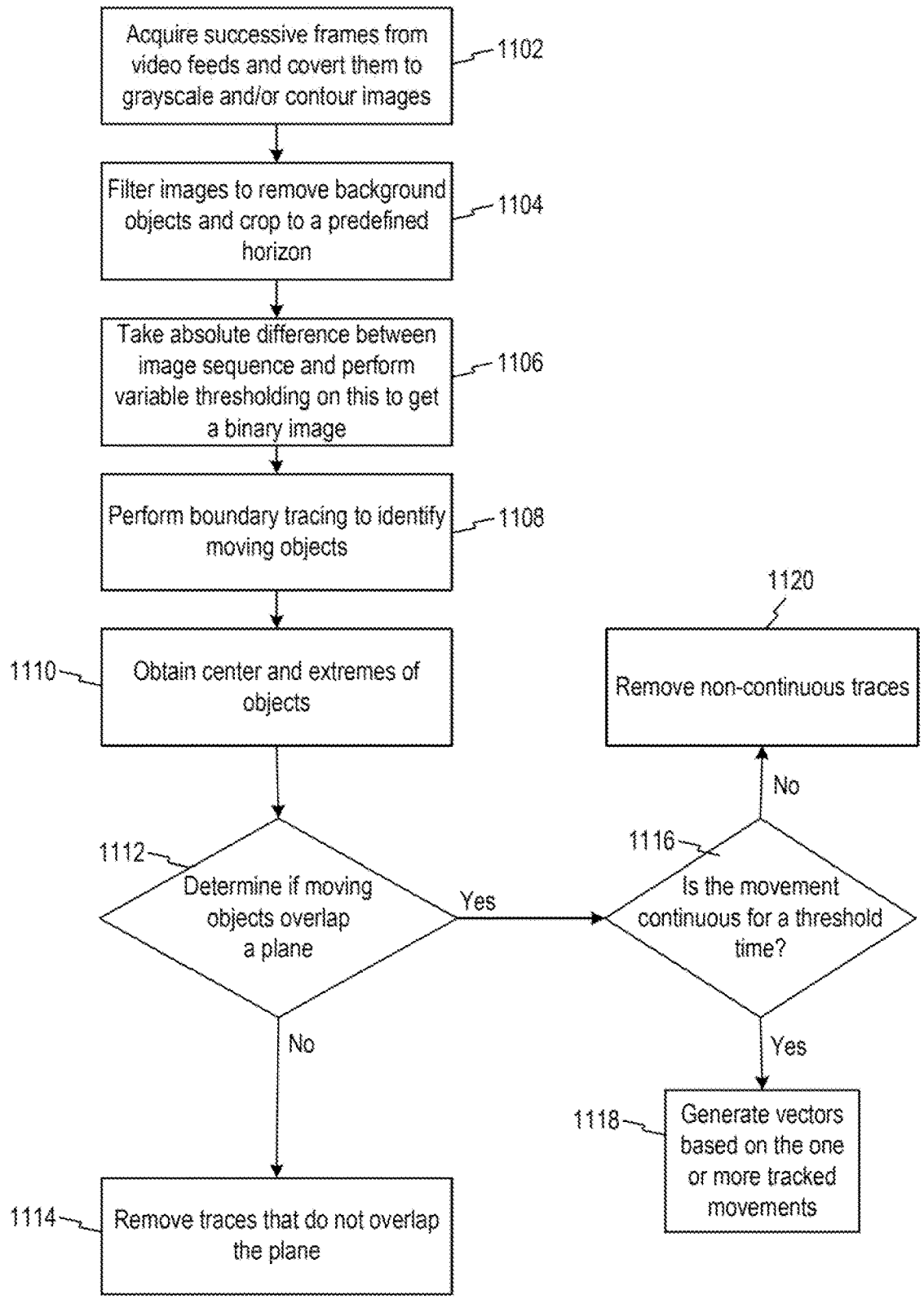
FIG. 11 is a flow chart illustrating an exemplary process for generating vectors based on writing object movements, consistent with disclosed embodiments.

FIG. 11 is a flow chart illustrating an exemplary process 1100 for generating vectors based on writing object movements, consistent with disclosed embodiments. Process 1100 may allow elements of system 100, such as mobile devices 150 to generate trace files from movements in a video feed.

In some embodiments, as described below, process 1100 may be executed by one or more mobile devices 150. In other embodiments, process 1100 (or parts of process 1100) may be performed by other elements of system 100 such as A&I server 120 (FIG. 1). Further, in some embodiments, multiple elements of system 100 may perform process 1100.

In step 1102, mobile devices 150 may acquire successive frames from video feeds and covert them to grayscale and/or contour images. For example, mobile devices 150 may capture multiple images from a video feed displayed in AR viewer, and compress the file size by stripping out color information or limiting the image to only contour information, using for example the contour techniques described in connection to FIG. 7.

In step 1104, mobile devices 150 may filter images to remove background objects and crop to a predefined horizon. In step 1106, mobile devices 150 may take absolute differences between images in a sequence and perform variable thresholding get a binary image. In order to analyze images efficiently and capture differences of object positions, which may correlate movements of the writing object, by creating a differential sequence of images that shows changes between frames of a video feed. In addition, to improve signal to noise ratio (SNR) of the differential images, mobile devices 150 may perform variable thresholding to get a cleaner binary image.

In step 1108, mobile devices 150 may perform boundary tracing to identify moving objects. For example, in step 1108 mobile devices 150 may perform one or more of a square tracing algorithm, a Moore-neighbor tracing algorithm, a radial sweep, and/or a Theo Pavlidis' algorithm. In step 1110, mobile devices 150 may obtain center and extremes of objects. In some embodiments, mobile devices 150 may employ deep-learning object detection to recognize centers and extremes of the objects in the differential images.

In step 1112, mobile devices 150 may determine whether a moving object is overlapping a plane. For example, mobile devices 150 may determine whether an object that is moving between frames of the video is moving along a single plane. If mobile devices 150 determine that the moving object is not overlapping a plane (step 1112: No), mobile devices 150 may determine that the perceived movement is not related to writings and move to step 1114 and remove traces that do not overlap the plane. However, if mobile devices 150 determine that the moving object is overlapping the plane (step 1112: Yes), mobile devices 150 may continue to step 1116.

In step 1116, mobile devices 150 may determine whether the movement of the object has been continuous for a threshold time. For example, using the differential images, mobile devices 150 may determine whether an object that is moving in a plane has been moving continuously for at least 2 seconds. If mobile devices 150 determines that the movement has not been continuous (step 1116: No), mobile devices 150 may determine that the movement is not intended to be a recorded writing and continue to step 1120 and remove the non-continuous trace. However, if in step 1116 mobile devices determined that the movement has been continuous (step 1116: Yes), mobile devices 150 may determine the user intends to record movements and generate one or more vectors based on the tracked movements (step 1118).

In some embodiments, a processor may perform processes similar to process 1100 by performing operations of generating a filtered video by removing objects different than the writing object from the video feed, identifying a movement path of the tip by performing a boundary tracing operation on the filtered video, generating a tracing image by highlighting pixels in the movement path, generating a augmented reality video by combining the tracing image with the video feed, and displaying the augmented reality video in the augmented reality viewer.

Figure 12:
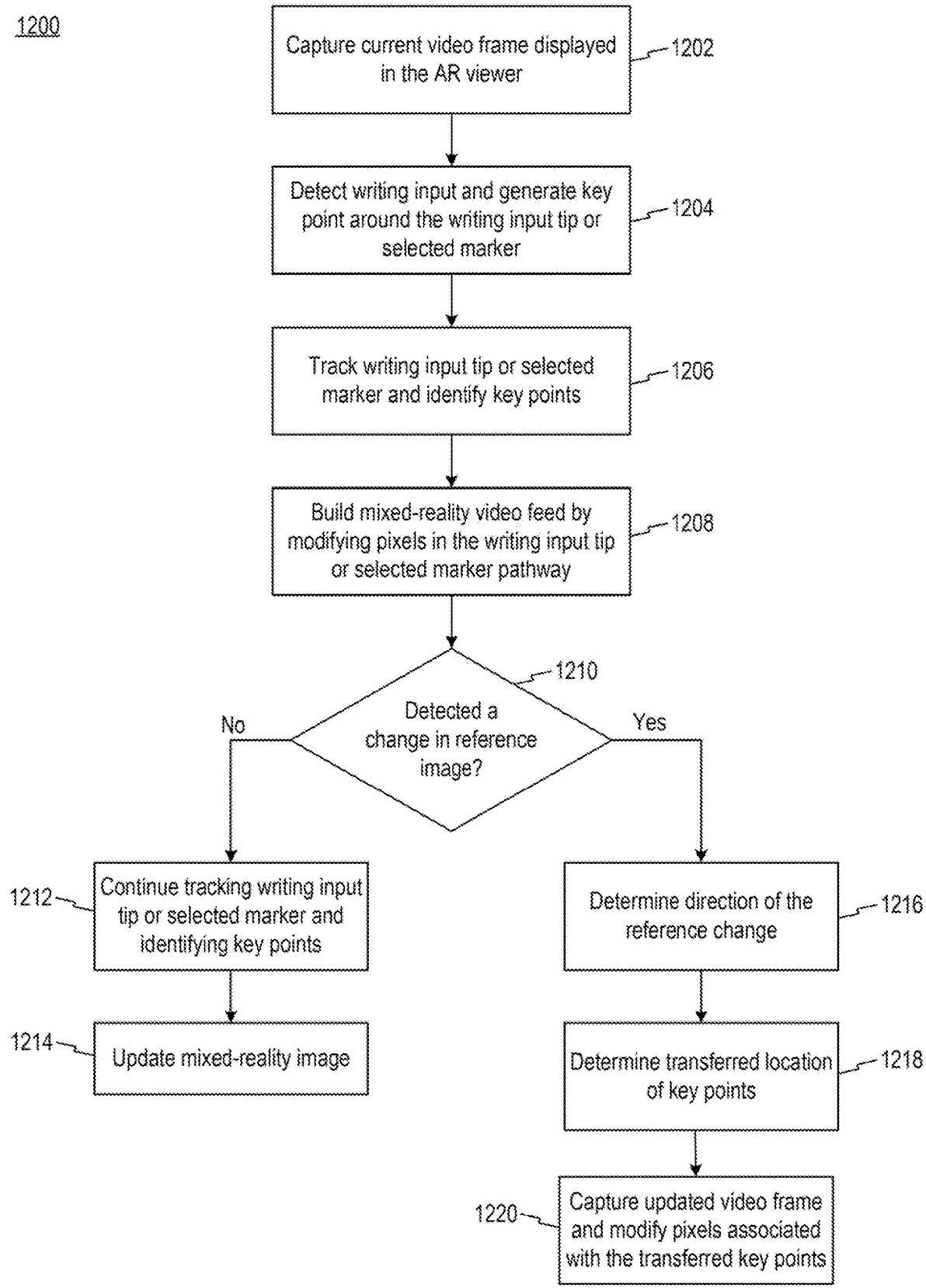
FIG. 12 is a flow chart illustrating an exemplary process for building augmented reality user interfaces, consistent with disclosed embodiments.

FIG. 12 is a flow chart illustrating an exemplary process 1200 for building augmented reality user interfaces, consistent with disclosed embodiments. In some embodiments, as described below, process 1200 may be executed by one or more mobile devices 150, such as mobile device 150-1. In other embodiments, process 1200 (or parts of process 1200) may be performed by A&I server 120 (FIG. 1). Further, in some embodiments, multiple elements of system 100 may perform process 1200.

In step 1202, mobile devices 150 may capture frames of current or real-time video frames displayed in the AR viewer. For instance, mobile devices 150 may capture frames of a video that a user is capturing using AR application 314 (FIG. 5).

In step 1204, mobile devices 150 may detect writing input and generate a key point around the writing input tip or selected marker. For example, as described above in connection with FIG. 6, mobile devices 150 may identify a writing input in an AR viewer, by identifying contours of objects in the AR viewer, and identify a tip or an extreme of the AR viewer. In step 1204, mobile devices may generate a modified video feed in which the tip of the AR viewer is highlighted with a different color or a marker.

In step 1206, mobile devices 150 may track a writing input tip or selected marker and identify key points. For example, mobile devices 150 may generate a virtual file that stores movements of the tip in the AR viewer. In some embodiments the virtual file may include an image file such as a bitmap or a raster file. In other embodies, the virtual file may be a vector or a text file with coordinates of the tip movement. In step 1206, mobile devices 150 may also identify key points in the tracked paths. For example, mobile devices 150 may determine the points of change in direction are key points or may determine that points in which the tip stopped moving are key points.

In step 1208, mobile devices 150 may build an AR GUI that modifies a video feed by changing appearance of pixels in a path of the writing input tip. For example, in some embodiment, mobile devices 150 may use ARKit tools to modify a video feed using the virtual file of step 1206. In such embodiments, mobile devices 150, and more specifically processor 302 (FIG. 3), may execute operations to modify a video feed such as:

```
importUIKit
  import SceneKit
  import ARKit
  class ViewController: UIViewController, ARSCNViewDelegate {
    @IBOutlet var capturedView: ARSCNView!
    override func viewDidLoad( ) {
    super.viewDidLoad( )
      capturedView.delegate = self
    }
    override func viewWillAppear(_ animated: Bool) {
    super.viewWillAppear(animated)
      let configuration = ARImageTrackingConfiguration( )
      if let trackedImages =
ARReferenceImage.referenceImages(inGroupNamed: "ARImages",
bundle: Bundle.main) {
         configuration.trackingImages = trackedImages
         configuration.maximumNumberOfTrackedImages = 1
    }
      sceneView.session.run(configuration) }
      override func viewWillDisappear(_ animated: Bool) {
      super.viewWillDisappear(animated)
      func renderer(_ renderer: SCNSceneRenderer, didAdd node:
SCNNode, for anchor: ARAnchor) {
         let videoScene = SKScene(size: CGSize(width: 480, height: 360))
         node.addChildNode(planeNode)
      }
}
```

In step 1210, mobile devices 150 may determine whether a change in a reference image has been detected. To create better MR experiences, mobile devices 150 may update the GUI when a user changes the position of the camera and the background image recorded. For example, as a user moves the camera, mobile devices 150 may update the displayed MR view to show how written text stays in a position of the GUI while other features of the background get displayed. To monitor movement of the camera, or the user, mobile devices 150 may perform operations that track orientation or movement of mobile devices 150. For example, mobile devices 150 may track the orientation or position of a user's view using accelerometers, gyroscopes, and magnetometers to determine how the device is positioned or it has been moved from an original position. In such embodiments, when mobile devices 150 is moved around, mobile devices 150 may determine the reference or background image will or has changed. Alternatively, or additionally, mobile devices 150 may use position tracking systems, like HTC Vive or the HoloLens, that require extra sensors for more accurate movement tracking.

If in step 1210 mobile devices 150 determine that there is no change in the reference (or background) image (step 1210: No), mobile devices 150 may continue to step 1212. In step 1212, mobile devices 150 may continue tracking a writing input tip (or the selected marker) and continue identifying key points in the field of view to render the modified GUI. As a user moves the writing input, or more specifically the tip of the writing input, mobile devices 150 may update the AR GUI in step 1214. For example, as the user moves the writing object, mobile devices may track the movements of the writing object and show traces on the AR GUI that show the traced path of the tip of the writing object. In some embodiments, as further disclosed in connection to FIG. 6, the tracked movements may be selected or conditional on the depth or the plane of the movement.

If in step 1210 mobile devices 150 determine that there is a detected change in the reference (or background) image (step 1210: Yes), mobile devices 150 may continue to step 1216. In step 1216, mobile devices 150 may determine a direction of the change in reference image. For example, employing movement sensors, like accelerometers, mobile devices 150 may determine a direction of movement of mobile devices 150. Alternatively, or additionally, mobile devices 150 may determine a movement direction based on differences between images captured from a live video feed. Based on the directed of the reference image changes, in step 1218 mobile devices 150 may determine a transferred location of key points displayed in the AR viewer. For example, in generating an AR GUI mobile devices 150 may identify key points, or anchor points, in the field of view that can be used to include the modification (such as the tracks of the writing object). In step 1218, mobile devices 150 may identify the new location of those key or anchor points and update the video modifications based on the new location of the key points. In this way, mobile devices 150 may respond to movements of mobile devices 150 to create a realistic user experience in which the AR or MR elements of the video move and change based on the movements of the camera.

In step 1220, mobile devices 150 may generate an updated AR GUI that uses the transferred key points. For example, in step 1220 mobile devices 150 may generate an updated AR GUI that shows updated video frame and modify pixels associated with based on the transferred key points. In some embodiments, in step 1220 mobile devices 150 may calculate video modifications by extrapolating movement of modified pixels by using the new location of key points in the refreshed MR GUI.

Figure 13:
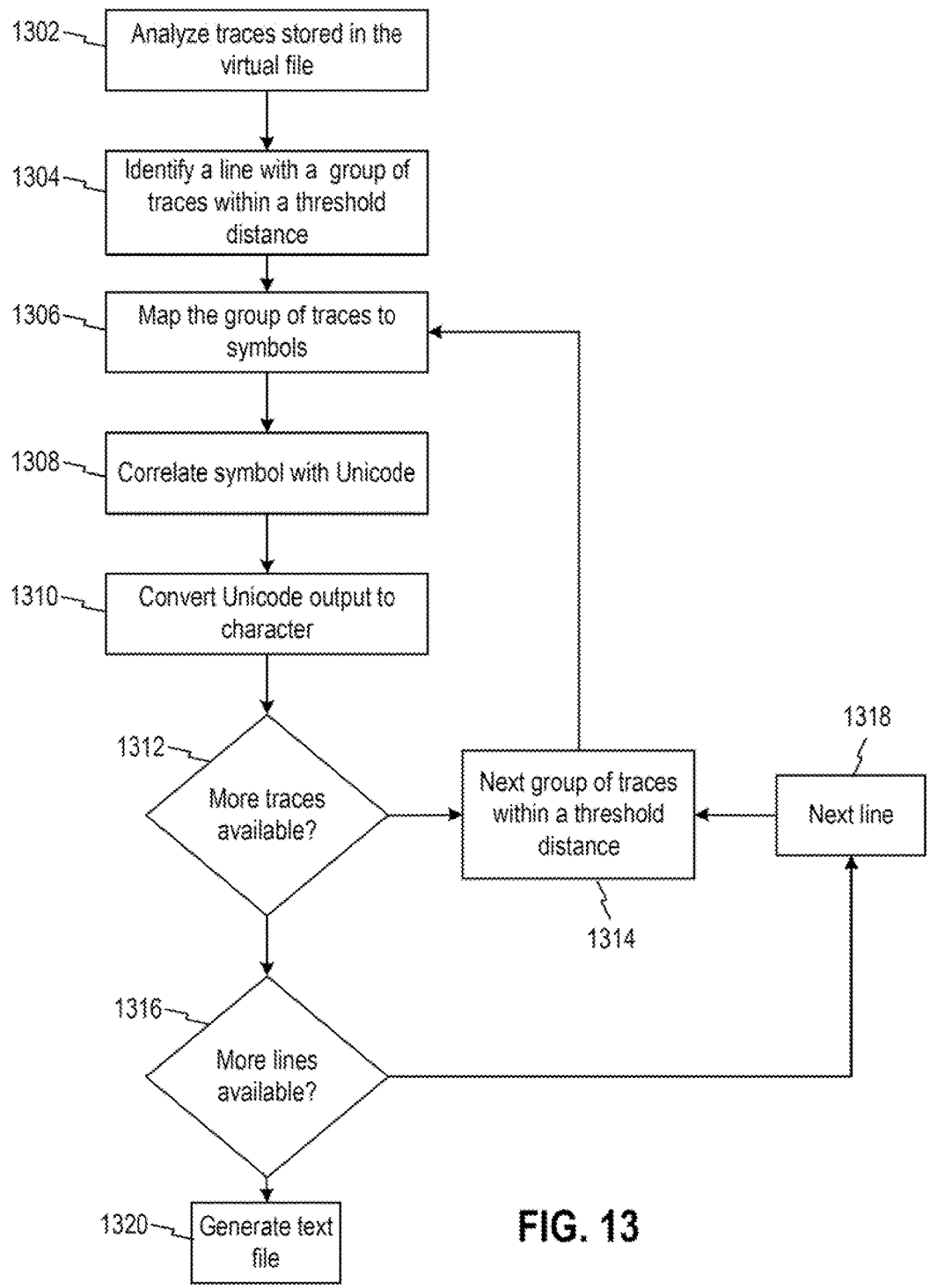
FIG. 13 is a flow chart illustrating an exemplary text identification process \, consistent with disclosed embodiments.

FIG. 13 is a flow chart illustrating an exemplary text identification process 1300, consistent with disclosed embodiments. In some embodiments, as described below, process 1300 may be executed by one or more mobile devices 150. For example, processor 302 (FIG. 3) may preform steps of process 1300. In other embodiments, process 1300 (or parts of process 1300) may be performed by A&I server 120 (FIG. 1). Further, in some embodiments, multiple elements of system 100 may perform process 1300.

In step 1302, mobile devices 150 may analyze traces stored in a virtual file. When the virtual file includes images, like bitmaps, in step 1302 mobile devices 150 may identify traces in the images. When the virtual file includes coordinates of movement, in step 1302 mobile devices 150 may identify movement patterns based on timing of movements and general traces.

In step 1304, mobile devices 150 may, based on the analysis of step 1302, identify a line of text in the virtual file. In some embodiments, the line of text may be traces within a threshold distance and a substantial horizontal direction. In step 1306, mobile devices 150 may map the group of traces in the line to symbols. For example, mobile devices 150 may isolate traces in the text line and associate sub groups of the traces with a symbol. In some embodiments, the symbols mapped in step 1306 may include OCR-A or MICR symbols.

In step 1308, mobile devices 150 may correlate each symbol identified in step 1306 with Unicode. In step 1310, mobile devices 150 may convert the Unicode to an output character. In this way mobile devices 150 may identify text in inputs on the AR viewer using the writing input.

In step 1312, mobile devices 150 may determine whether there are more traces available. For example, mobile devices 150 may determine whether all traces in the line have already been correlated with a character. If mobile devices determine that more traces are available, mobile devices 150 may continue to step 1314 and move to a next group of traces that are within a threshold distance from the analyzed group and return to step 1306 to map the group of traces in the new line of text to symbols. However, if mobile devices determine that there are no more traces available (step 1312: No), mobile devices 150 may continue to step 1316.

In step 1316, mobile devices 150 may determine whether more lines of traces are available. For example, mobile devices 150 may scan other portions of the virtual file to determine whether more lines are available. If additional lines are available in the virtual file (step 1316: Yes), mobile devices 150 may continue to step 1318 and analyze the next line. However, if more lines are not available (step 1316: No), mobile devices 150 may continue to step 1320 and generate a text file with the identified characters. In some embodiments, in step 1320 mobile devices 150 may transmit the text file to other devices or display the text on an AR viewer.

Figure 14:
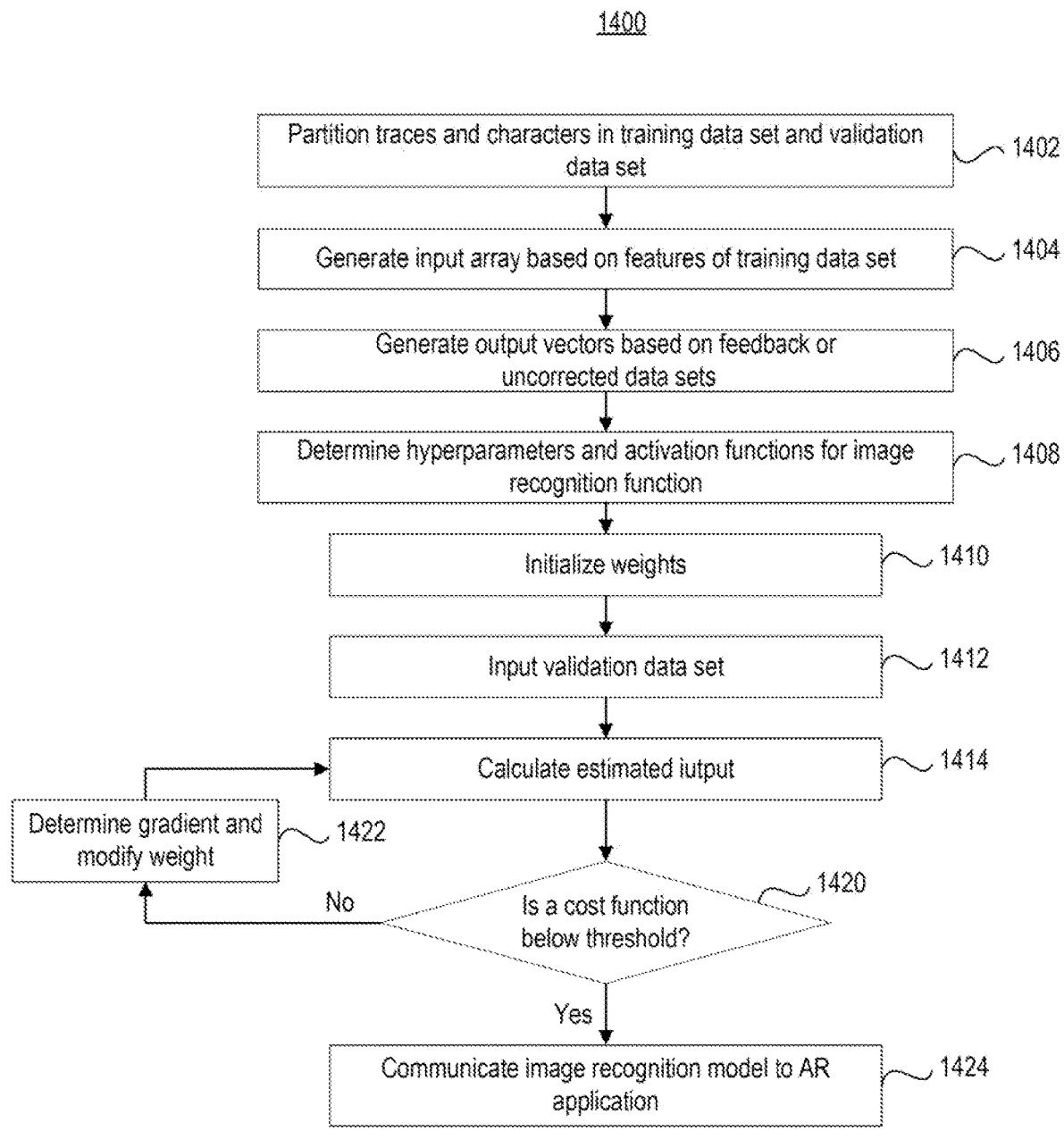
FIG. 14 is an exemplary flow chart illustrating a process for generating an identification model, consistent with disclosed embodiments.

FIG. 14 is an exemplary flow chart illustrating a process 1400 for generating an identification model, consistent with disclosed embodiments. In some embodiments, process 1400 may be executed by A&I server 120 (FIG. 4). In other embodiments, process 1400 (or parts of process 1400) may be performed by mobile devices 150 (FIG. 3). Further, in some embodiments, multiple elements of system 100 may perform process 1400.

The description below of steps in process 1400 illustrates an embodiment in which A&I server 120 performs steps of process 1400. However, as previously discussed, other elements of system 100 may also be configurable to perform one or more of the steps in process 1400.

In step 1402, A&I server 120 may partition virtual files with traces and recognized characters into a training data set and a validation data set. For example, A&I server 120 may receive data representing a plurality of images of writing traces. In some embodiments, the images may be associated with metadata describing attributes of the image or the text in the traces. A&I server 120 may divide the virtual files and generate two groups, one to train a convolutional neural network (CNN) and a second to validate the model.

In step 1404, A&I server 120 may generate an input array based on features of the training data set. For example, A&I server 120 may generate a variable including feature information of virtual files in the training data set.

In step 1406, A&I server 120 may generate output vectors based on metadata of the training data set. For example, based on the images in the training data set, A&I server 120 may generate a desired output vector identifying characters and text that is included in the virtual files of the training data set.

In step 1408, A&I server 120 may determine hyperparameters and activation functions to initialize the model to be created. For example, A&I server 120 may select a number of layers and nodes and determine whether the network will be fully or partially connected. In addition, in step 1408 A&I server 120 may determine the dimensionality of the network and in step 1410 A&I server 120 may initialize weights for the model.

In step 1412, A&I server 120 may apply the input array based on features of training data set of step 1404 to calculate an estimated output in step 1414 and a cost function. In step 1420, A&I server 120 may determine whether the cost function is below a threshold of required accuracy, which may be specified by the user. If A&I server 120 determines that the cost function is not below a threshold and the required accuracy has not being achieved (step 1420: No), A&I server 120 may continue to step 1422 and determine a gradient to modify weights in synapsis or modify the activation functions in the different nodes. However, if the cost function is below a threshold (step 1120:

Yes), A&I server 120 may accept the model and communicate the model to a server in system 100 and/or mobile devices 150 in step 1424.

Figure 15:
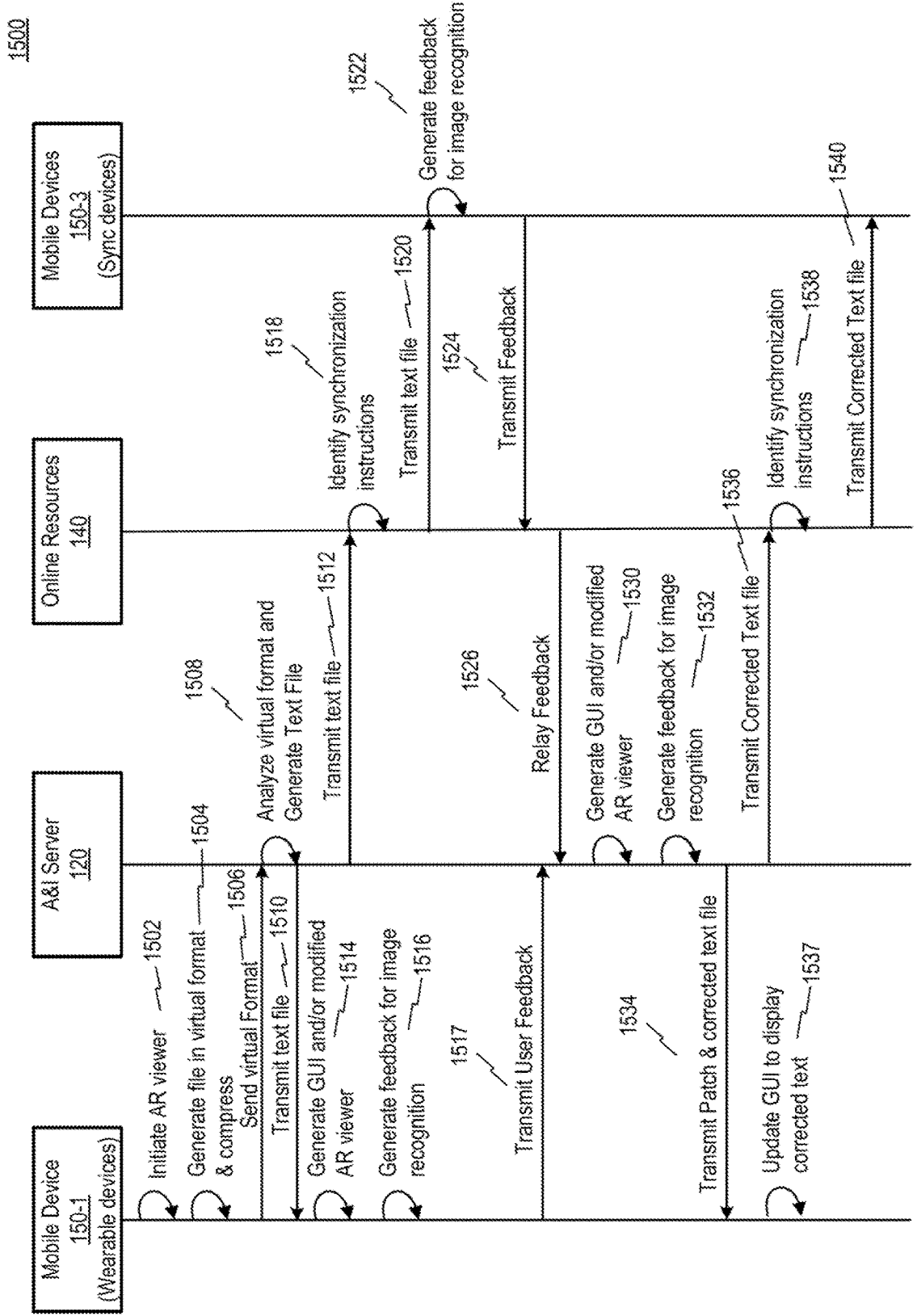
FIG. 15 is a process flow illustrating an exemplary communication sequence, consistent with disclosed embodiments.

FIG. 15 is a process flow illustrating an exemplary communication sequence 1500, consistent with disclosed embodiments. As shown in FIG. 15, communication sequence 1500 may involve multiple elements of system 100, including exemplary mobile devices (150-1 and 150-3), A&I server 120, and online resources 140. However, other elements of system 100 may be involved in communication sequence 1500. For example, databases 180 may perform some of the steps of communication sequence 1500.

In step 1502, mobile device 150-1, which in some embodiments may be a wearable device such as smart glasses capturing video, may initiate AR viewer. For example, mobile device 150-1 may execute AR application 314 (FIG. 5). In some embodiments, mobile device 150-1 may display an AR viewer in a screen of exemplary mobile device 150-1. In such embodiments, mobile device 150-1 may show an AR viewer that displays an AR GUI showing the images captured by cameras overlaid with icons or AR tools. In other embodiments, mobile device 150-1 may execute AR application 314 passively and in the background, without displaying the AR viewer a specific GUI. In such embodiments, mobile device 150-1 may only use capture images without interfering with the user's experience and without any required activation. Rather, mobile device 150-1 may initiate AR application 314 when mobile device 150-1 is turned on and passively and continuously monitor movements of a writing input.

In step 1504, mobile device 150-1 may generate a virtual file storing traces of movements of a writing input captured by mobile device 150-1. In some embodiments, the generation of the virtual file does not require any activation of the user. For example, rather than start tracking with some kind of activation (e.g., using a specifically programmed device or a command), mobile device 150-1 may passively and persistently track motions of writing inputs to generate the virtual file. Further, in some embodiments, mobile device 150-1 may analyze the patterns and behaviors of the writing input to automatically exclude non-text segments. For example, as further described in connection with FIG. 7, mobile device 150-1 may exclude segments that do not match a depth of the writing plane. Moreover, in some embodiments, mobile device 150-1 may compress the virtual file to facilitate transmission. In step 1506, mobile device 150-1 may send the virtual file to A&I server 120.

In step 1508, A&I server 120 may analyze the virtual file and generate a text file. For example, as discussed in connection with FIGS. 11 and 13, A&I server 120 may preform OCR, ICR, and IWR operations to identify characters or words based on the information of the virtual file. In steps 1510, A&I server 120 may transmit the text file of step 1508 to exemplary mobile device 150-1.

In some embodiments, as shown in FIG. 15, A&I server 120 may also transmit the text file to online resources 140 in step 1512. For example, when mobile device 150-1 is synchronized with other devices, A&I server 120 may use online resources 140 to broadcast the generated text file to multiple devices. In such embodiments text that is identified through wearable devices may automatically become available in other devices like cellphones or laptops.

In step 1514, mobile device 150-1 may generate a GUI and/or modify the AR viewer. For example, mobile device 150-1 may generate an MR view using operations further discussed in connection with FIG. 12. In some embodiments, the GUI of step 1514 may display at least a portion of the text in the text file. In step 1516, exemplary mobile device 150-1 may receive feedback for image recognition. For example, a user of mobile device 150-1 may provide feedback using a voice recording and or some other user input. The feedback may evaluate the accuracy of the text file and, as further described in connection with FIG. 12, the user feedback may be used a training data for machine learning models. In step 1517, mobile devices 150 may transmit the user feedback to A&I server 120.

In embodiments that use device synchronization, the user feedback may also be generated from synchronized devices. Indeed, in such embodiments it may be easier for users to provide feedback using synchronized devices since wearable devices have limited input availability.

In step 1518, online resources 140 may receive the text file from A&I server 120 and identify synchronization instructions. For example, online resources 140 may identify the identity of the devices that are synchronized with mobile device 150-1. Based on the identification of synchronization instructions, in step 1520 online resources 140 may transmit the text file to synchronized mobile devices 150-3. For example, online resources 140 may send the text file received from A&I server 120 to cellphones, laptops, and smart watches in step 1520.

In step 1522, synchronized mobile devices 150-3 may generate feedback for the image recognition. The feedback generated in step 1522 may have the same formats as the feedback of step 1516. However, in some embodiments, the feedback generated in step 1522 may have different formats and be more comprehensive. For example, in some embodiments synchronized mobile devices 150-3 may generate feedback as text files specifying each character that should have been identified. In step 1524, synchronized mobile devices 150-3 may transmit the feedback information to online resources 140 and in step 1526 online resources may relay the feedback information to A&I server 120.

Whether using feedback information from mobile device 150-1 or using the feedback from synchronized mobile devices 150-3, in step 1530 A&I server 120 may generate instructions to display a GUI with a modified AR viewer. Further, in step 1532 A&I server 120 may generate a patch for the data identification model correcting mistakes of the OCR, ICR, or IWR process. The patch may be an updated CNN or may also include exceptions for correlations between traces and characters. In some embodiments, the patch may include correction to OCR tables based on the feedback.

In step 1534, A&I server 120 may transmit patch and/or the corrected text to mobile device 150-1 and in step 1535 mobile device 150-1 may update the AR viewer GUI to display the corrected text.

The corrected text may also be transmitted to the synchronized devices. For example, in step 1536 A&I server 120 may transmit the corrected text file to online resources 140 while in step 1537 mobile device 150-1 updates a GUI to display corrected text. Online resources 140 may identify synchronization instructions for corrections in step 1538. In step 1540, online resources may transmit the corrected text file to synchronized mobile devices 150-3 identified in the synchronization instructions.

The description of communication sequence 1500 is only exemplary and other elements of system 100 may perform steps of communication sequence 1500. For example, in some embodiments mobile devices 150 perform operations of receiving a voice command indicative of a feedback request, generating a transcription file based on audio recorded after the feedback request, and transmitting the transcription file, the virtual file, and the text file to a server. Further, mobile devices 150 may perform operations of receiving a patch file from the server, where the patch may include neural network or CNN activation functions and updating the image recognition operation using the patch file.

Figure 16:
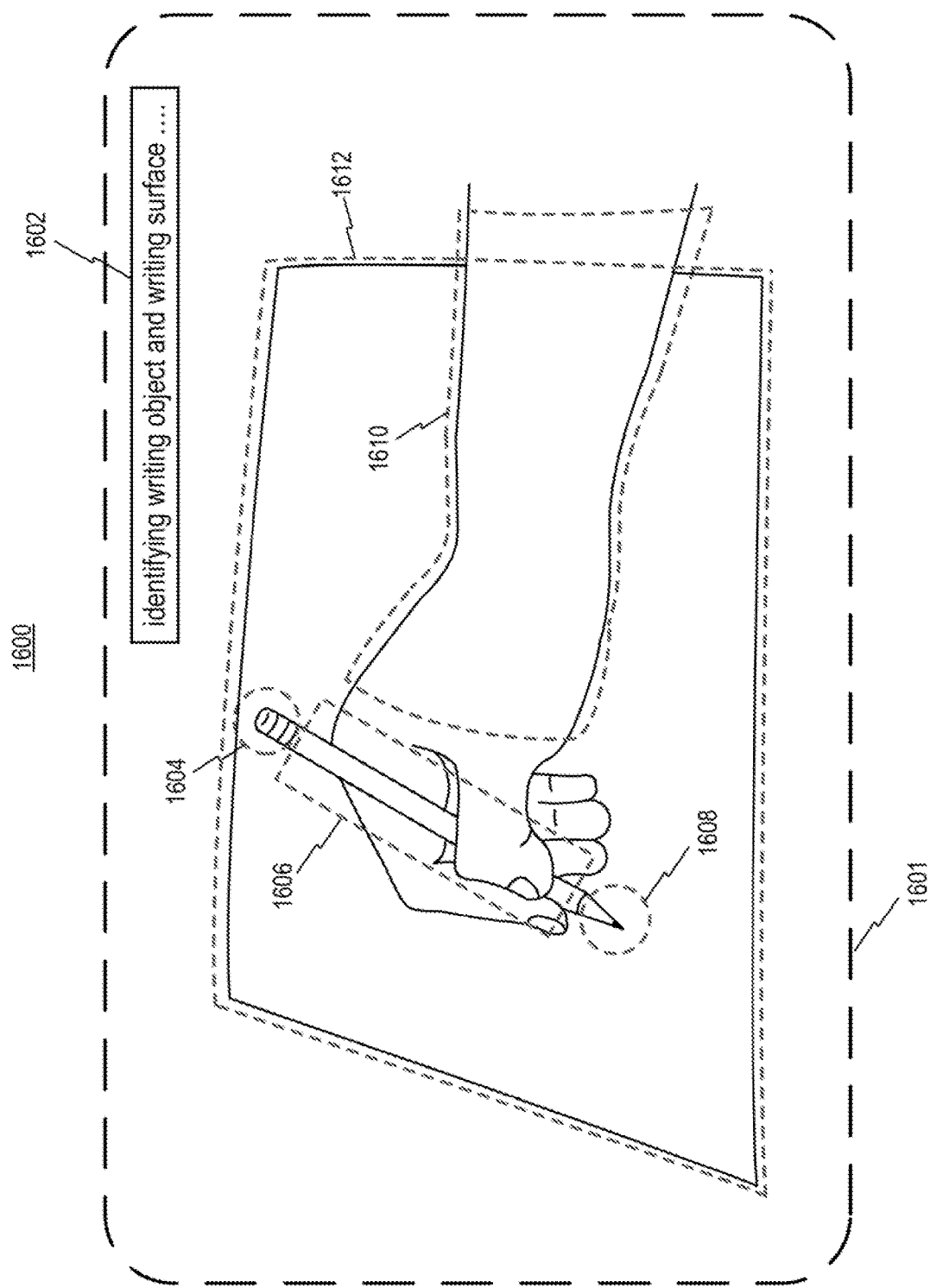
FIG. 16 is an exemplary graphical user interface showing identification of elements in an augmented reality viewer, consistent with disclosed embodiments.

FIG. 16 is an exemplary GUI 1600 showing identification of elements in an AR viewer, consistent with disclosed embodiments. GUI 1600 may be displayed in screens of one or more mobile devices 150 when a user initiates a writing mode or when mobile devices 150 identify a writing object in an AR viewer.

GUI 1600 may include an AR viewer 1601 that displays images captured by cameras of the mobile devices 150. In some embodiments, the AR viewer 1601 may occupy all the screen of the mobile devices 150. In other devices, the AR viewer 1601 may occupy a portion the screen only.

In some embodiments, AR viewer 1601 may simply display the video feed captured by the cameras if not in a writing mode. However, if the writing mode is initiated (e.g., a user provides a signal for writing or image recognition identifies a writing object), AR viewer 1601 may display an AR GUI that uses AR tools to highlight the writing input.

As shown in FIG. 16, GUI 1600 may display a message 1602 which specifies a status of the application. For example, message 1602 may display the status of AR application 314 (FIG. 5). GUI 1600 may also highlight identified writing objects. In the example in FIG. 16, a pencil has been identified as the writing object and GUI 1600 highlights writing body 1606, writing tip 1608, and erasing object 1604. In addition, in some embodiments GUI 1600 may also highlight a limb 1610 connected to the writing object. For example, as shown in FIG. 16, GUI 1600 may highlight an arm or hand holding the writing object. In addition, GUI 1600 may also highlight a writing plane 1612. As further discussed in connection with FIG. 6 writing plane 1612 may be identified based on tracked movements of writing tip 1608.

While FIG. 16 shows GUI 1600 highlighting multiple elements shown in AR viewer 1601, in some embodiments only select elements may be highlighted in the AR viewer. For example, in some embodiments only writing tip 1608 may be highlighted while all the other elements are only displayed with their natural view.

Figure 17A:
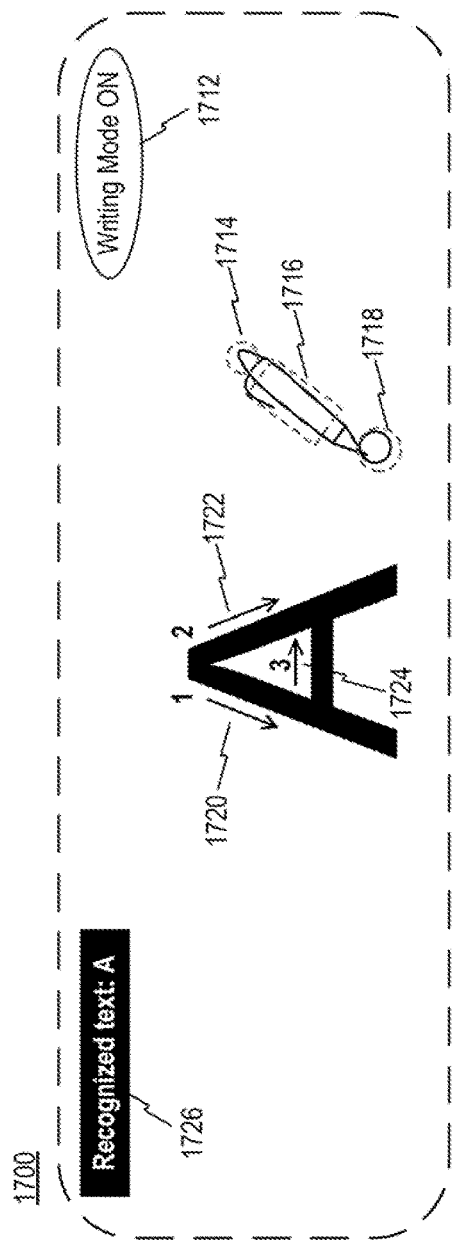
FIG. 17A is an exemplary augmented reality graphical user interface displaying recognized traces of letters in an augmented reality viewer, consistent with disclosed embodiments.

FIG. 17A is an exemplary AR GUI 1700 displaying recognized traces of letters in an augmented reality viewer, consistent with disclosed embodiments. GUI 1700 shows an AR viewer displaying a writing mode icon 1712, a writing object (in this example a pen) with a writing tip 1718, a writing body 1716, and an erasing object 1714. In some embodiments, a process may modify a video feed by superimposing writing mode icon 1712 over a background of the video feed in response to identifying the writing object.

GUI 1700 shows tracked movements of writing tip 1718 showing three traces displayed in the AR viewer. As discussed in connection with FIG. 7, when writing mode has been activated, a processor may track movements of the writing tip. Further, as described in connection with FIG. 12, the tracked movements may be displayed in an AR viewer to show the user recorded traces. FIG. 17A shows a sample GUI 1700 where three traces have been recorded and displayed. Traces 1720, 1722, and 1724, have been identified as tracked movements.

Further, GUI 1700 may display an image feedback box 1726. Image feedback box 1726 may display results of an OCR, ICR, or IWR analysis of the traces captured in AR viewer. In some embodiments, a processor may superimpose feedback box 1726 over background of a video feed, and feedback box 1726 may be displaying a group of one or more characters in the text file.

Figure 17B:
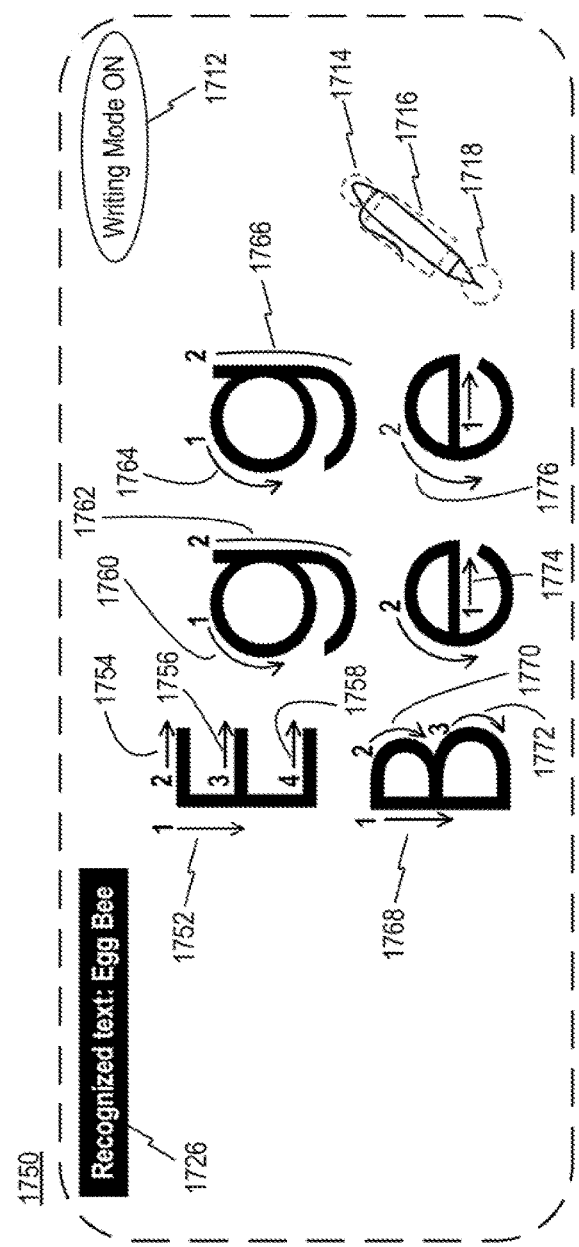
FIG. 17B is an exemplary augmented reality graphical user interface displaying recognized words in an augmented reality viewer, consistent with disclosed embodiments.

FIG. 17B is an exemplary AR GUI 1750 displaying recognized words in an augmented reality viewer, consistent with disclosed embodiments. Similar to GUI 1700, GUI 1750 also shows writing mode icon 1712, writing tip 1718, writing body 1716, and an erasing object 1714. Further, GUI 1750 also displays image feedback box 1726. However, unlike GUI 1700, GUI 1750 shows tracing of complete words. GUI 1750 shows a plurality of traces 1752-1766 that spell the word "Egg." As described in connection with FIG. 13, processors may analyze traces 1752-1766 in real time to identify text using character or word identification techniques. GUI 1750 also displays a second line of text with traces 1768-1776 spelling the word "Bee."

Image identification operations may be employed to recognize characters or words based on the traces and results of the image analysis may be displayed in the AR viewer. For example, results of the image identification may get displayed on image feedback box 1726.

FIGS. 18A-18J describe a sequence of exemplary AR GUIs describing multiple stages of a text recognition operation, consistent with disclosed embodiments.

FIG. 18A shows a GUI 1810 that may be displayed at a first time when processors determine a writing mode should be initiated. For example, GUI 1810 may be displayed soon after a processor identifies a writing object or when a user gives a voice command. GUI 1810 may display an AR viewer 1802 which may include a status icon 1812. In the example of FIG. 18, the writing object is a finger and GUI 1810 may highlight a writing tip 1815 (tip of the finger). Further, in certain embodiments, GUI 1810 may also highlight a limb 1817.

FIG. 18B shows a GUI 1820 that may be displayed at a second time, as writing tip 1815 moves in the AR viewer 1802. As the writing tip 1815 moves, GUI 1820 may display a feedback box 1825 and a writing mode icon 1822. In addition, GUI 1820 may display a writing tip first point 1824 and a trace 1826. The trace 1826 may be displayed in the video feed captured by the AR viewer 1802 in real time by, for example, changing color of the pixels in the path.

FIG. 18C shows a GUI 1830 that may be displayed at a third time, as writing tip 1815 changes direction. In GUI 1830, a new trace 1832 may be displayed on AR viewer 1802. Similarly, FIG. 18D shows a GUI 1840 with a new trace which may indicate that writing tip 1815 changed direction and store trace 1842 as a new trace. GUI 1840 may be displayed at a fourth time when a first character has been recognized based on the three tracked traces. Thus, in FIG. 18D, feedback box 1825 may start displaying recognized character. In such embodiments, real-time recognition of characters based on the identified traces may facilitate feedback by the user and improve recording capabilities.

Figure 18F:
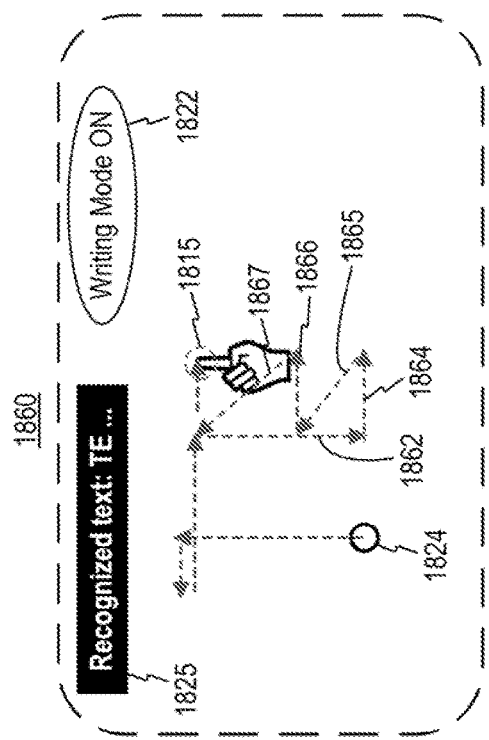
Figure 18H:
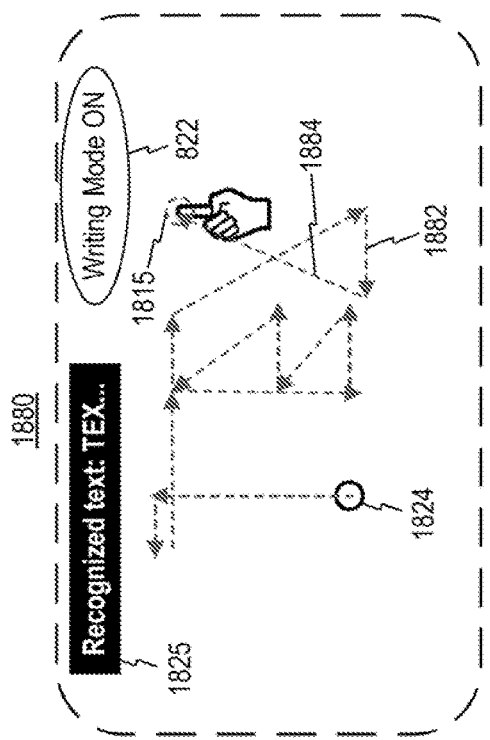
Figure 18E:
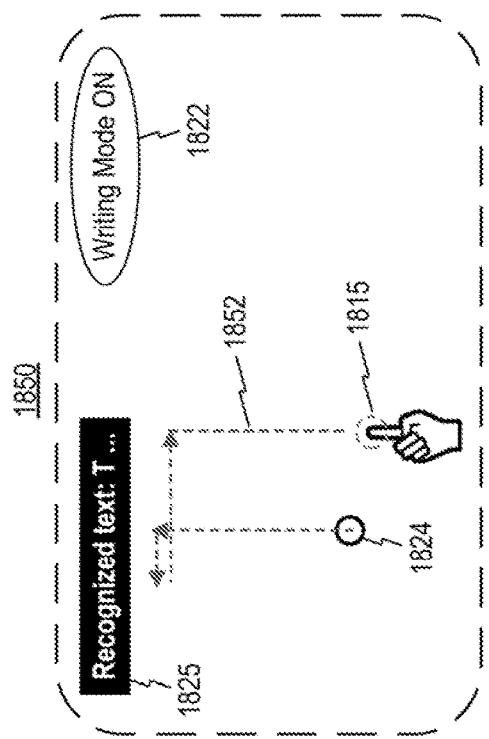
Figure 18G:
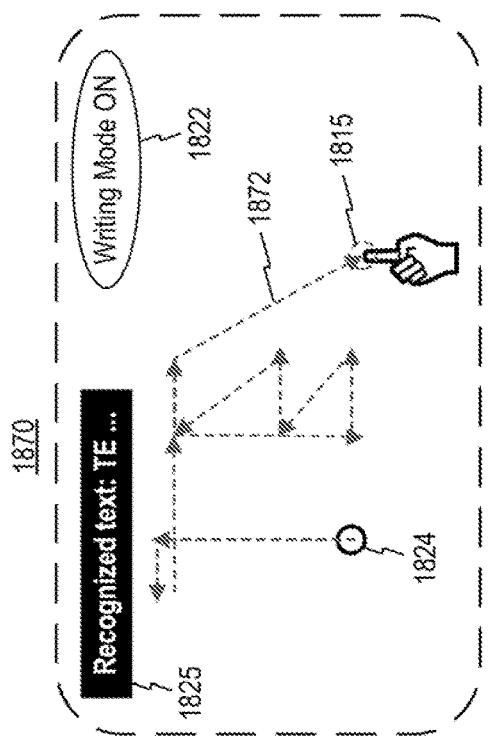

FIG. 18E shows a GUI 1850 which may be displayed at a fifth time in which a user may start making traces for a new character. GUI 1850 shows that a new trace 1852 is recorded in AR viewer 1802. FIG. 18F shows a GUI 1860 in which multiple traces have been recorded to complete a second character in the traces. GUI 1850 shows characters 1862-1867. As shown in FIG. 18F, some of the traces do not form part of the intended character. Thus, image recognition algorithms, like the ones described in connection with FIG. 14, may improve accuracy of the image identification process. FIG. 18F shows that real-time image recognition of characters allows having feedback box 1825 which displays the second character FIG. 18G shows a GUI 1870 in which a new trace 1872 has been tracked. FIG. 18 H shows a GUI 1880 which may be displayed at an eight time once a new character has been recognized. Traces 1872, 1882, and 1884, generate a new character "X" that is displayed in feedback box 1825.

Figure 18I:
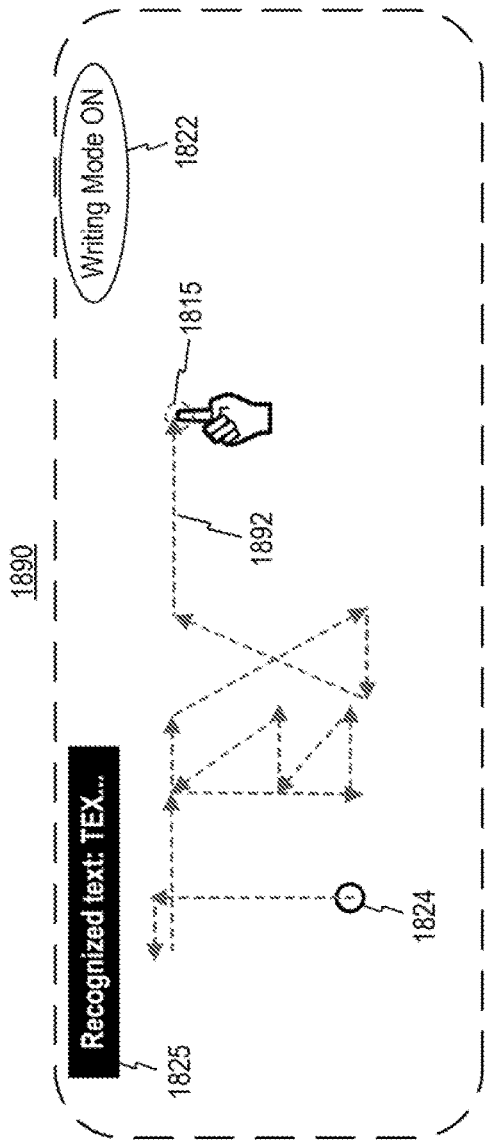
Figure 18J:
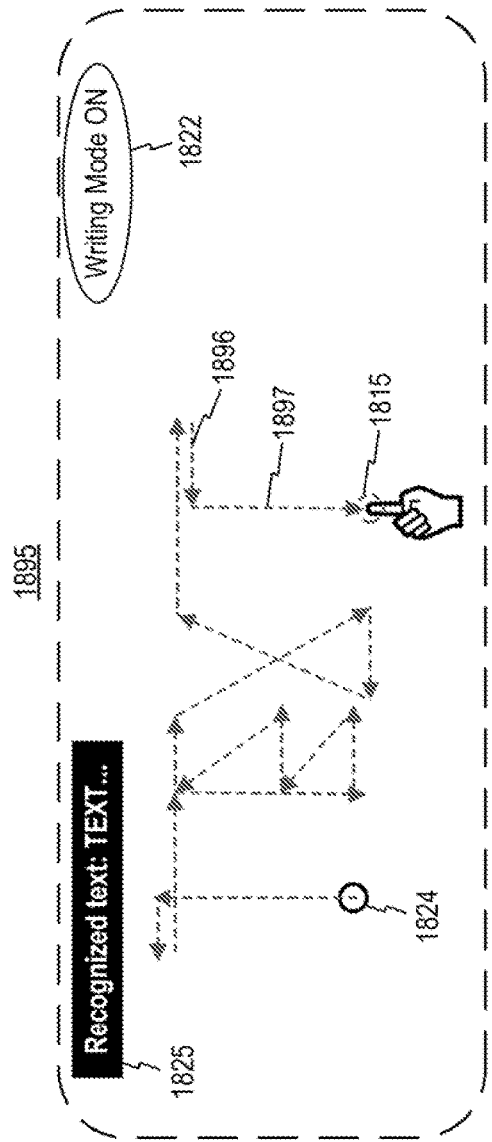

FIG. 18I shows a GUI 1890 in which a new trace 1892 has been tracked at a ninth time. FIG. 18J shows a GUI 1895 which may be displayed at a tenth time once a new character has been recognized. Traces 1892, 1896, and 1897, generate a new character "T" that is displayed in feedback box 1825.

FIG. 18 show an exemplary process of writing identification. As further described in connection with FIG. 7, the writing identification process may be finalized based on movements of writing tip 1815 or user commands.

Figure 19:
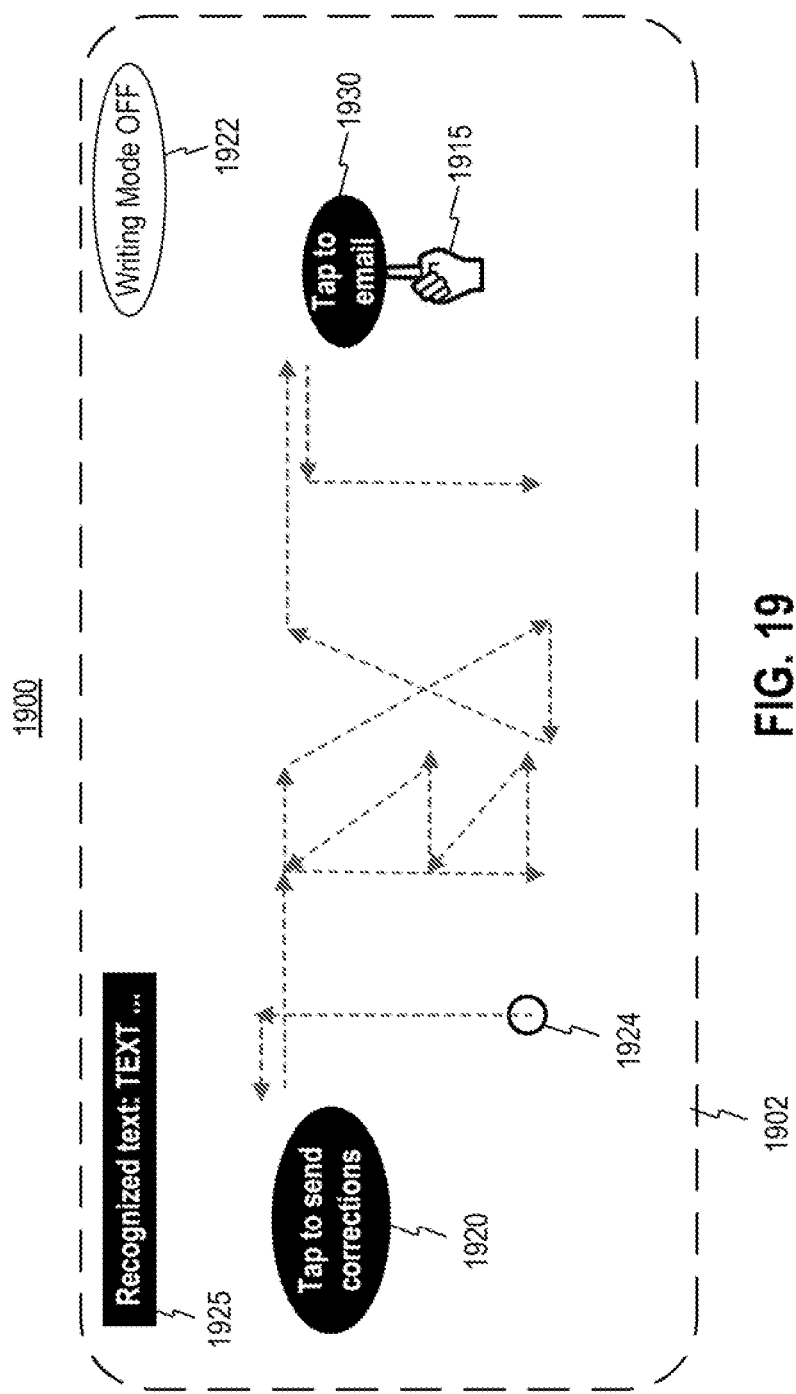
FIG. 19 is an exemplary augmented reality graphical user interface displaying transmission options after image recognition, consistent with disclosed embodiments.

FIG. 19 is an exemplary augmented reality GUI 1900 displaying transmission options after image recognition, consistent with disclosed embodiments. GUI 1900 may be presented once a user terminates a writing mode. For example, after the writing mode described in connection with FIG. 18, one of mobile devices 150 may display GUI 1900.

GUI 1900 may display an AR viewer 1902 that shows traces collected during the writing mode, a first point 1924, and writing object 1915 (in this example a hand). In addition, GUI 1900 (like GUI 1895) may display a feedback box 1925. However, instead of displaying a writing mode icon 1822, GUI 1900 may display a termination icon 1922.

In addition, GUI 1900 may display a corrections icon 1920 and a transmission icon 1930. Correction icon 1920 may be displayed in the AR environment and may interact with objects displayed in the AR viewer 1902. For example, correction icon 1920 may interact with writing object 1915 and when writing object 1915 touches correction icon 1920, processors may execute instructions, like providing feedback or recording voice commands. Thus, GUI 1900 may facilitate providing feedback to initiate the machine-learning or patching processes described in connection with FIGS. 10 and 15. Similarly, GUI 1900 may display transmission icon 1930 being interactive with writing object 1915. When writing object selects or interacts with transmission icon 1930, processors may send a virtual file or the recognized text to a server. For example, mobile devices 150 (FIG. 3) may send text files or virtual files to A&I server 120 (FIG. 4) when a user selects transmission icon 1930. However, in some embodiments the transmission of file may be automatic. For example, in embodiments in which a server performs the image identification, mobile devices 150 may, upon identifying the termination signal, automatically transfer the virtual file to a server to then receive, from the server, the text file with recognized characters.

Figure 20A:
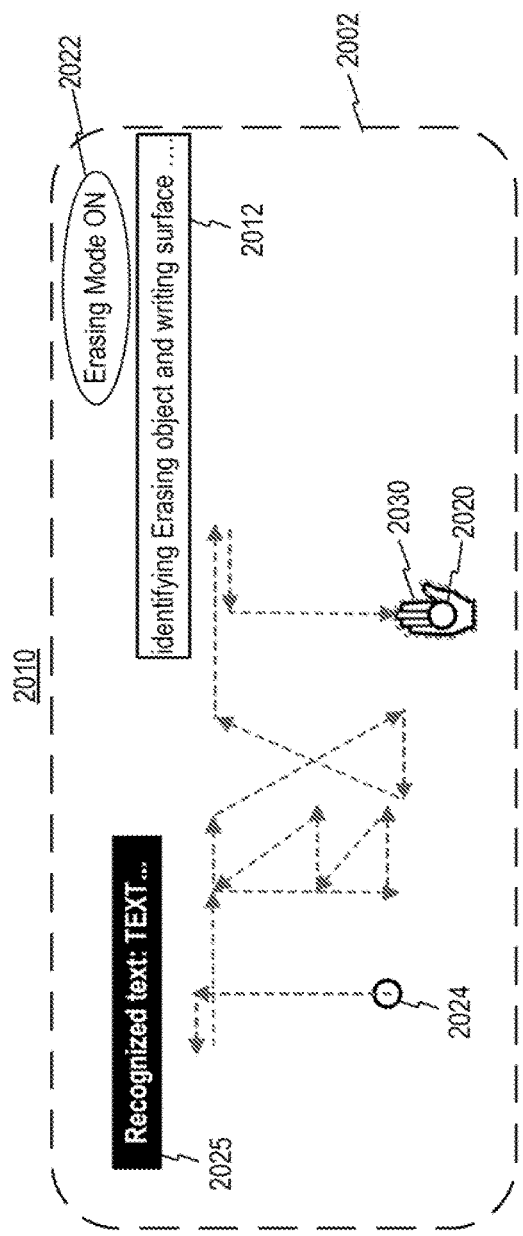
FIG. 20A is an exemplary augmented reality graphical user interface displaying a first stage of an erasing mode, consistent with disclosed embodiments.

FIG. 20A is an exemplary augmented reality GUI 2010 displaying a first stage of an erasing mode, consistent with disclosed embodiments. GUI 2010 may be displayed when a user initiates an erasing mode. As described above in connection with FIG. 8, a user may initiate an erasing mode with a gesture or a command. For example, a user may initiate an erasing mode with an opened hand gesture or with a voice command.

GUI 2010 includes an AR viewer 2002. As shown in FIG. 20A, AR viewer 2002 may display the traces captured previously during writing mode. For example, AR viewer 2002 may display the traces captured in the writing mode process described in connecting with FIG. 18. Similar to GUI 1895, GUI 2010 may also display a feedback box 2025 which displays characters or text identified based on the traces. Further, GUI 2010 may display an erase mode icon 2022, a status message 2012, and a first point 2024 highlighting the initial point of the captured traces. In some embodiments, a processor may modify video feeds by superimposing erasing mode icon 2022 over the background of the video feed in response to an erase mode gesture or command. In addition, GUI 2010 may highlight an erasing object 2030 (in the example shown in FIG. 20A the erasing object is an opened hand) and an erasing starting point 2020.

Figure 20B:
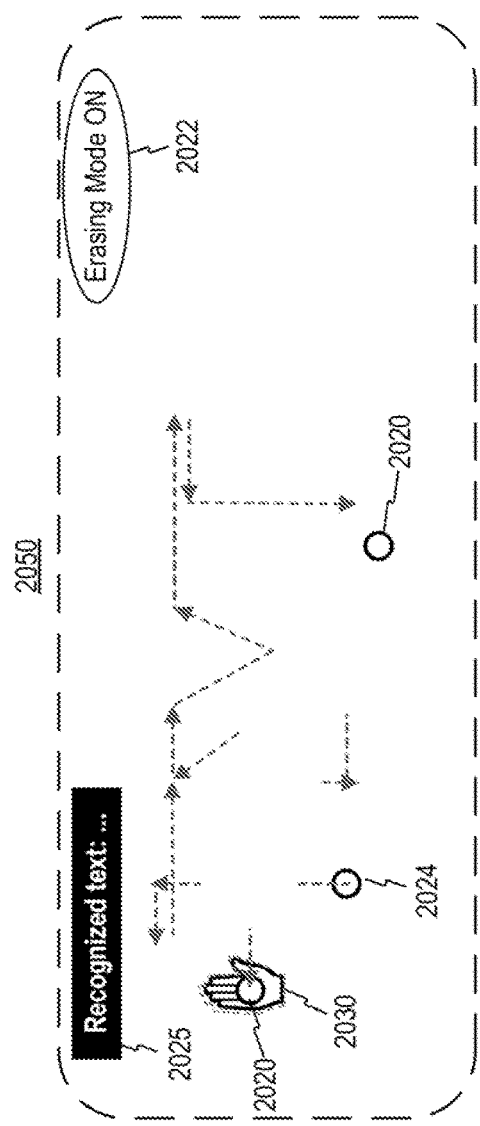
FIG. 20B is an exemplary augmented reality graphical user interface displaying a second stage of an erasing mode, consistent with disclosed embodiments.

FIG. 20B is an exemplary augmented reality GUI 2050 displaying a second stage of an erasing mode, consistent with disclosed embodiments. For the second stage, erasing object 2030 moved across the AR viewer 2002. Previously highlighted traces of writing inputs that are touched by erasing object 2030 may be deleted. That is, previously marked traces in the GUI may be removed, to show the background images, based on movements of erasing object 2030. In addition, because certain traces have been modified, FIG. 20B shows that feedback box 2025 no longer displays characters. Because in certain embodiments processors may constantly analyzing traces in the AR viewer 2002, when an erasing object 2030 modifies traces, the image identification results may be updated and change the output shown in feedback box 2025.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted. Furthermore, while some of the exemplary embodiments of the computerized methods were described using Python language or C to illustrate exemplary scripts and routines, the disclosed methods and systems may be implemented using alternative languages. The disclosed embodiments may use one or multiple programming languages in addition to Python or C. For example, the disclosed embodiments may also be implemented using Java, C++, C#, R, Go, Swift, Ruby, and/or their combinations.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. An augmented reality system, comprising:
one or more processors; and
one or more storage devices storing instructions that, when executed, cause the one or more processors to perform operations comprising:
identifying a writing object in a video feed being displayed in an augmented reality viewer;
estimating a range of motion of a tip of the writing object based on tracked movements of the tip;
determining when an additional object will obscure the tip of the writing object in the range of motion;
identifying, based on the determination that the additional object will obscure the tip, an erasing object of the writing object different from the tip;
tracking movements of the erasing object to determine an estimated movement of the tip based on a movement estimation model correlating the movements of the erasing object with movements of the tip;
modify an appearance of at least one pixel in the displayed video feed based on the estimated movement of the tip, at least one aspect of the modified appearance differing from a natural appearance of the at least one pixel in the augmented reality viewer;
detecting an erase-mode signal;
tracking additional movements of the erasing object in the augmented reality viewer based on the detected erase-mode signal; and
restoring the appearance of the at least one pixel to the natural appearance based on the tracked additional movements of the erasing object.

2. The augmented reality system of claim 1, wherein identifying the writing object includes:
identifying a plurality of objects displayed in the augmented reality viewer;
detecting at least one contour for at least one of the plurality of objects;
calculating, for the at least one of the plurality of objects, a length and aspect ratio of the at least one object based on a respective detected contour;
determining whether the at least one object of the plurality of objects is associated with a length above a threshold length and an aspect ratio above a threshold aspect ratio; and
upon determining that the at least one object is associated with the length above the threshold length and the aspect ratio above the threshold aspect ratio, identifying the at least one object as the writing object.

3. The augmented reality system of claim 2, wherein identifying the writing object further comprises:
upon determining that none of the objects are associated with a length above the threshold length and an aspect ratio above the threshold aspect ratio, identifying a limb by analyzing images from the video feed using a pre-trained convolutional neural network;
determining whether the limb is contacting one of the plurality of objects; and identifying an object contacting the limb as the writing object.

4. The augmented reality system of claim 1, wherein identifying the erasing object includes:
identifying a plurality of objects displayed in the augmented reality viewer;
detecting at least one contour for at least one of the plurality of objects; and
identifying the erasing object based on application of at least one identification rule to the at least one detected contour.

5. The augmented reality system of claim 1, wherein tracking additional movements of the erasing object in the augmented reality viewer includes determining a depth of the erasing object.

6. The augmented reality system of claim 5, wherein the video feed comprises at least two video feeds captured from different positions and wherein the depth of the erasing object is determined based on at least one stereographic operation using the at least two video feeds.

7. The augmented reality system of claim 6, wherein the operations further comprise identifying a writing plane in the video feed and wherein tracking additional movements of the erasing object comprises tracking additional movements of the erasing object based on a comparison of the depth of the erasing object to a depth of the writing plane.

8. The augmented reality system of claim 1, wherein the erase-mode signal is detected based on a voice command.

9. The augmented reality system of claim 1, wherein the erase-mode signal is detected based on a detected movement pattern of the writing object.

10. The augmented reality system of claim 1, wherein the operations further comprise, in response to detecting the erase-mode signal, modifying the video feed by superimposing an erasing mode icon over a background of the video feed.

11. The augmented reality system of claim 1, wherein the operations further comprise generating a virtual file storing the estimated movements of the tip and the tracked additional movements of the erasing object.

12. The augmented reality system of claim 11, wherein the operations further comprise generating a text file by performing an image recognition operation associating the estimated movements of the tip and the tracked additional movements of the erasing object stored in the virtual file with one or more characters.

13. The augmented reality system of claim 12, wherein the virtual file comprises three-dimensional vectors storing substantially continuous estimated movements of the tip as one vector.

14. The augmented reality system of claim 13, wherein the image recognition operation comprises:
identifying text lines in the estimated movement of the tip;
mapping a Unicode symbol to a first group of the three-dimensional vectors; and
converting the Unicode symbol to a character.

15. A computer-implemented method for generating augmented reality images, the method comprising:
identifying a writing object in a video feed being displayed in an augmented reality viewer;
determining, based on an estimated range of motion of a tip of the writing object based on tracked movements of the tip, when an additional object will obscure the tip in the estimated range of motion;
identifying, based on the determination that the additional object will obscure the tip, an erasing object of the writing object different from the tip;
tracking movements of the erasing object to determine an estimated movement of the tip based on a movement estimation model correlating the movements of the erasing object with movements of the tip; and
modify an appearance of at least one pixel in the displayed video feed based on the estimated movements of the tip, at least one aspect of the modified appearance differing from a natural appearance of the at least one pixel in the augmented reality viewer.

16. The computer-implemented method of claim 15, wherein tracking additional movements of the erasing object in the augmented reality viewer includes determining a depth of the erasing object, further comprising:
detecting an erase-mode signal;
tracking additional movements of the erasing object in the augmented reality viewer based on the detected erase-mode signal; and
restoring the appearance of the at least one pixel to the natural appearance based on the tracked additional movements of the erasing object.

17. The computer-implemented method of claim 16, wherein the video feed comprises at least two video feeds captured from different positions and wherein the depth of the erasing object is determined based on at least one stereographic operation using the at least two video feeds.

18. The computer-implemented method of claim 17, wherein the operations further comprise identifying a writing plane in the video feed and wherein tracking additional movements of the erasing object comprises tracking additional movements of the erasing object based on a comparison of the depth of the erasing object to a depth of the writing plane.

19. The computer-implemented method of claim 16, wherein the erase mode signal is detected based on at least one of a voice command or a detected movement pattern of the writing object.

20. A non-transitory computer-readable medium storing instructions that, when executed by at least one processor, cause the at least one processor to perform operations for generating augmented reality images, the operations comprising:
identifying a tip of a writing object in a video feed being displayed in an augmented reality viewer;
identifying an erasing object of the writing object different from the tip;
tracking movements of the erasing object;
determining an estimated movement of the tip using a movement estimation model to correlate the movements of the erasing object with movements of the tip, wherein the movements of the erasing object are used to estimate the movements of the tip based on a determination that an additional object will obscure the tip of the writing object in an estimated range of motion of the tip, wherein the estimated range of motion of the tip is based on tracked movements of the tip; and
modify an appearance of at least one pixel in the displayed video feed based on the estimated movements of the tip, at least one aspect of the modified appearance differing from a natural appearance of the at least one pixel in the augmented reality viewer.

* * * * *